(12) United States Patent
Schwieters et al.

(10) Patent No.: US 11,887,832 B2
(45) Date of Patent: Jan. 30, 2024

(54) MASS SPECTROMETER

(71) Applicant: Thermo Fisher Scientific (Bremen) GmbH, Bremen (DE)

(72) Inventors: Johannes Schwieters, Ganderkesse (DE); Gerhard Jung, Delmenhorst (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 0 days.

(21) Appl. No.: 17/703,899

(22) Filed: Mar. 24, 2022

(65) Prior Publication Data

US 2022/0223401 A1 Jul. 14, 2022

Related U.S. Application Data

(63) Continuation of application No. 16/981,891, filed as application No. PCT/EP2019/056884 on Mar. 19, 2019, now abandoned.

(51) Int. Cl.
*H01J 49/28* (2006.01)
*H01J 49/06* (2006.01)
*H01J 49/10* (2006.01)

(52) U.S. Cl.
CPC .......... *H01J 49/288* (2013.01); *H01J 49/067* (2013.01); *H01J 49/105* (2013.01)

(58) Field of Classification Search
CPC ....... H01J 49/288; H01J 49/067; H01J 49/105
See application file for complete search history.

(56) References Cited

U.S. PATENT DOCUMENTS

| 4,866,267 | A * | 9/1989 | Matsuda | H01J 49/326 250/281 |
| 4,924,090 | A * | 5/1990 | Wollnik | H01J 49/004 250/296 |
| 6,191,417 | B1 * | 2/2001 | Douglas | H01J 49/429 250/281 |
| 11,569,061 | B2 * | 1/2023 | Nagano | H01J 37/28 |
| 2003/0030007 | A1 * | 2/2003 | Karimata | H01J 37/12 250/396 R |
| 2007/0069150 | A1 * | 3/2007 | Frosien | H01J 37/05 250/396 ML |
| 2021/0066022 | A1 * | 3/2021 | Meng | H01J 37/28 |
| 2021/0249221 | A1 * | 8/2021 | Okai | H01J 37/28 |

* cited by examiner

*Primary Examiner* — Wyatt A Stoffa

(57) ABSTRACT

An isotope ratio mass spectrometer has an ion source, a static field mass filter, a reaction cell to induce a mass shift reaction, and a sector field mass analyser for spatially separating ions from the reaction cell according to their m/z. A detector platform detects a plurality of different ion species separated by the sector field mass analyser. The static field mass filter has a first Wien filter that deflects ions away from a longitudinal symmetry axis of the spectrometer in accordance with the ions' m/z, and a second Wien filter that deflects ions back towards the longitudinal symmetry axis in accordance with the ions' m/z. An inverting lens is positioned along the longitudinal axis between the Wien filters to invert the direction of deflection of the ions from the first Wien filter. The static field mass filter provides high transmission and improved spectrometer sensitivity. The first and second Wien filters permit simple tuning.

36 Claims, 28 Drawing Sheets

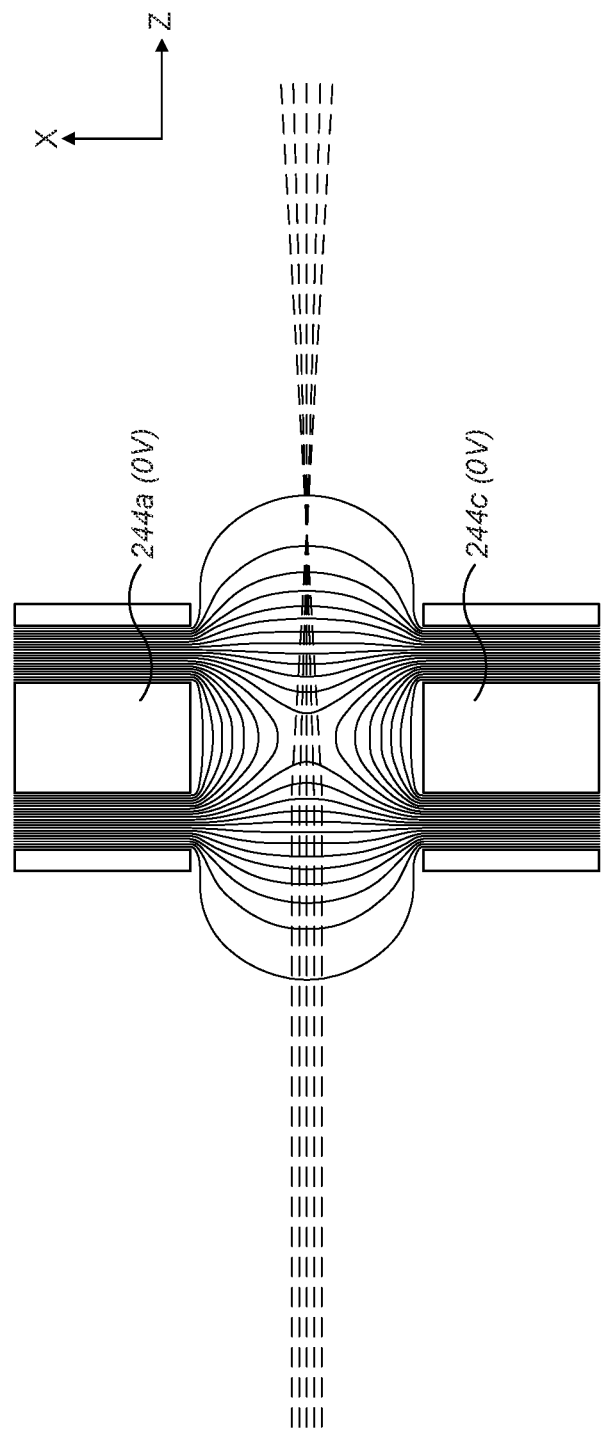

MASS SPECTROMETER

CROSS-REFERENCE TO RELATED APPLICATIONS

This application is a continuation of U.S. patent application Ser. No. 16/981,891, filed Mar. 19, 2019. U.S. patent application Ser. No. 16/981,891 is a National Stage application filed under 35 USC § 371 of International Patent Application No. PCT/EP2019/056884, filed on Mar. 19, 2019. PCT Application No, PCT/EP2019/056884, claims priority to GB 1804386.9, filed Mar. 19, 2018, both of which are incorporated by reference herein in their entirety.

FIELD OF THE INVENTION

This invention relates to a static field mass filter for a mass spectrometer and a mass spectrometer, in particular, but not exclusively, for isotope ratio mass spectrometry (IRMS).

BACKGROUND OF THE INVENTION

Mass spectrometers are used to analyse the m/z ratios of ions which have been generated by an ion source from a sample. Before analysis, the ions might be further exposed to other processes in one or more reaction cells. Further mass filters may be used to reduce the amount of analysed ions by selecting only ions in a specific m/z range of a m/z window. Such a mass filter is arranged between the ion source and mass analyser of a mass spectrometer.

Isotope ratio analysis is a specific branch of mass spectrometry. It is used to measure the relative abundance of isotopes (isotope ratio). Gaseous samples containing elements: in particular carbon, hydrogen, nitrogen and oxygen containing stable isotopes can be studied to provide quantitative data in a variety of disciplines from forensic science and biomedical research through to geological and environmental analysis. For example, the stable isotopic composition of oxygen and carbon ($^{18}O/^{16}O$ and $^{13}C/^{12}C$) is an important proxy indicator of paleoenvironmental changes recorded in carbonate minerals deposited, for example, as marine sediments.

Various techniques have been established for the measurement of isotopic ratios. For example, mid-infrared spectroscopy can be used to determine the isotopic ratios of $^{12}O$ to $^{13}O$ and $^{16}O$ to $^{18}O$ in gaseous samples. Another technique that has been long established for isotopic ratio analysis is isotope ratio mass spectrometry. Each technique has its advantages and disadvantages.

IRMS generally mandates careful sample preparation, to ensure the provision of a clean, uncontaminated sample for measurement using IRMS. High precision and accurate isotope ratio measurements also require that the IRMS is capable of discriminating between isobaric interferences of species with the same nominal mass. For example, it may be necessary to discriminate between $H^{16}O$ and $^{13}CH_4$ at 17 amu, or between isotopologues of the same gas with the same cardinal mass (eg $^{13}CH_4$ and $^{12}CH_3D$, each of which has a nominal mass of 17 amu).

A general review of IRMS may be found in Brenna et al, Mass Spectrometry Reviews, 1997, 16, p227-258.

As the analytes become heavier, the number of potential interferences increases. Heavier elements may have many isotopes, covering broader and often overlapping mass ranges. For example, titanium has 5 stable isotopes with masses 46, 47, 48, 49 and 50. These can overlap with stable isotopes of calcium (mass numbers 44, 46 and 48), vanadium (50 and 51) and chromium (mass numbers 50, 52, 53 and 54).

Specific devices have been developed to address the challenges of accurately quantifying isotope ratios of species which have multiple interferences, particularly when investigating heavier elements such as rare earth elements, iron and the like. In particular, an Inductively Coupled Plasma (ICP) ion source is a very efficient ion source that can be coupled to a mass spectrometer for elemental and isotopic analysis. Commercial arrangements are capable of detecting very low concentrations of elements, as low as 1 part in $10^{15}$ (one part in a quadrillion) when those elements are low background and non-interfering.

A specific form of IRMS using an ICP source employs a magnetic sector analyser to separate ions spatially in flight. Double focusing is employed (kinetic energy focusing in an electrostatic analyser (ESA), and kinetic energy plus momentum focusing in the magnetic sector analyser. Ions of different mass to charge ratios are deflected by different angles as they pass through the magnetic sector, and are focussed upon an array of detectors at a downstream location. One such device is the Neptune™ and Neptune Plus™ High Resolution Multicollector ICP-MS device sold by Thermo Fisher Scientific, Inc.

Such multicollector (MC) ICP-MS devices offer high mass resolution, high sensitivity, high dynamic ranges, and robust linearity and stability. One of the challenges of such devices, however, is a relatively poor detection limit for analysis of certain elements. The analyte elements that cause the greatest difficulties are those that interfere with unwanted molecular and/or atomic ions that are generated inside the ICP source. The unwanted molecular and/or atomic ions are usually derived from the plasma gas, matrix components and the solvent used to solubilize samples. For example, $^{40}Ar^{16}O$ interferes with $^{56}Fe$, $^{40}Ar^{12}C$ interferes with $^{52}Cr$ and $^{40}Ar^{40}Ar$ interferes with $^{80}Se$.

Provided that the resolution of the MC ICP-MS is high enough, analyte species can be separated from interfering unwanted molecular/atomic species because they will be separated along the focal plane at the detectors. As discussed in WO-A-2012/007559, the entrance slit of the detector can be used to separate out the analyte ions (which are allowed to enter the detector) from the unwanted interfering ions which do not enter the detector. Such an arrangement works well when the relative mass deviation between the analyte and the interference (M/ΔM) is less than around 2,000-10, 000. However, higher mass resolution (to discriminate between the analyte and unwanted interferences) comes at the expense of reduced ion optical transmission because narrow detector entrance slits are needed, along with smaller apertures before the ESA and magnetic sector analysers.

Even then, the degree of interference between some analyte ions and unwanted molecular/atomic species generated by the ICP source is such that they cannot be discriminated. For example, the masses of singly charged calcium and argon ions ($^{40}Ca^+$ and $^{40}Ar^+$) are sufficiently similar to require a resolution in excess of 193,000 to separate the two ions. This is much higher than can be achieved with a traditional ICP-MS device.

One way in which the problem of interferences in ICP-MS devices has been addressed is through the use of a reaction cell, in particular a collision cell positioned between the ICP source and the magnetic sector analyser. Various mechanisms can be employed. The reaction cell, e.g. collision cell may neutralise the charge of interfering ions, via resonant charge transfer. For example, argon ion removal can be achieved by charge transfer from argon ions to hydrogen gas which is introduced as a collision gas into the collision cell. Kinetic energy discrimination can be carried out through collisions in the collision cell. Alternatively, molecular species may be collisionally dissociated in the collision cell, to remove isobaric molecular interferences from elemental species. As another mechanism, mass shift reactions can take place with the collision gas. For example, oxygen may be introduced into the collision cell. If the oxygen preferentially reacts with an isobaric interference, then the formed oxide interfering species is shifted in mass away from the element of interest (by 16 or 18 amu) and thus does not show up as an interference.

Thus the use of a collision cell can expand the capability of a high resolution IRMS, by using reactions to remove interferences that could not otherwise be resolved through separation in space as the ions pass through the ICP-MS.

Nevertheless, a collision cell has its own drawbacks. Reacting an isobaric interference with, for example, oxygen, can result in an oxide which no longer interferes with a first analyte species. However, the oxide itself may then interfere with a different, second analyte species. For example, Ti and Sc isotopes have mass numbers around 45-49. In order to avoid interference with background elements with similar mass numbers, oxygen can be used in the collision cell so as to form ScO and TiO. Whilst this overcomes the problem of interferences having mass numbers around 45-49, the resultant TiO and ScO then have the potential to interfere instead with Cu and Ba background ions having mass numbers around 63-65.

To address this, WO-A-2017/029200, the contents of which are incorporated by reference in their entirety, proposes the use of a quadrupole mass filter between the ion source and the collision cell. The quadrupole mass filter can be set to act as an ion guide with full mass range transmission, or it can be set to permit passage of only a relatively narrow mass window instead. The benefit of this is that it allows pre-filtering of ions to reduce the problems with interference. In the example set out above, for instance, the quadrupole mass filter can be set only to allow ions of mass number in a window around 45-49 to be allowed to pass through. This means that the heavier Cu and Ba ions are filtered out by the quadrupole analyser. The quadrupole analyser does not remove the background ions which interfere with the Ti and Sc ions (since it is their similar nominal mass that creates the interference in the first place). The Ti and Sc ions are reacted with oxygen in the downstream collision cell so as to form oxides. These oxides no longer interfere with the Cu or Ba background ions, however, because those Cu and Ba ions were previously removed by the quadrupole analyser.

The separation of ions in an ion beam through the tuning of an RF amplitude and DC potential applied to the electrodes of the quadrupole, rather than via spatial separation (as occurs in a magnetic sector analyser), permits transmission of a wide range of mass-to-charge (m/z) ratio windows, from a full m/z range down to a narrow m/z window of a fraction of an amu. In each case, the selected ions exit the mass filter through the same exit aperture, with minimal lateral dispersion. Applying a specific RF amplitude to the electrodes of the quadrupole makes the RF filter particularly suited for coupling with a collision cell, which has a small (typically 2 mm) entrance aperture and so requires a relatively undispersed ion beam.

The use of a pre-filter with a collision cell in an ICP-MS thus provides significant benefits. Even so, the very particular demands of specific applications of IRMS calls for the consideration of all aspects of the ion optical system, in order to achieve the levels of accuracy and precision required. For example, some geoscience applications mandate a level of precision and accuracy of the measured isotope abundance ratio in the range of 20 ppm or better.

To achieve such levels of precision and accuracy, it is necessary to consider and correct for all of the sources of mass discrimination within the apparatus, from the sample preparation, sample delivery (eg laser operating conditions), ionization, transmission and detection. Any systematic shifts will introduce a resulting difference between the measured and the true isotope abundances in the sample.

In ICP-MS, it is observed that higher mass ions are transmitted in greater quantities than lower mass ions. This effect is known as mass fractionation and results in a difference between the measured/observed isotope ratio and the theoretical/actual isotope ratio. The main causes of mass fractionation are understood to be space charge effects near the skimmer cone of the transfer lens system of the ICP-MS (which space charge effects have a much greater effect on lighter ions with lower momenta than on heavier ions with higher momenta) and supersonic expansion between the sample and skimmer cones. The effect is dependent upon instrument tuning and may change over time.

To control instrumental mass discrimination, a number of techniques are known. A detailed review of calibration and correction techniques in laser ablation ICP-MS and MC-ICP-MS may be found in "Calibration and correction of LA-ICP-MS and LA-MC-ICP-MS analyses for element contents and isotopic ratios, by Lin et al, Solid Earth Sciences Vol. 1 Issue 1, June 2016, Pages 5-27.

The most common method for correcting instrumental mass discrimination is to measure the unknown sample against a known standard and to use this to calculate a deviation from a measured isotope ratio of the sample and standard. Various drawbacks exist with this procedure.

A second known technique is known as in situ fractionation correction, and is employed particularly when studying an element having two (or more) isotopes, one of which has an abundance that changes over time due to radioactive decay, and the other of which remains constant (and is known). A normalizing ratio can then be calculated based upon a ratio of the varying and invariant isotopes.

The normalising ratio measured empirically may not be the same as the actual normalising ratio, as a consequence of kinetic effects in nature and/or systematic shifts introduced by the spectrometer. A mathematical correction algorithm is thus applied, based upon the deviation of the measured and true normalising ratios, in order to calculate a mass deviation for all masses of the element of interest.

The correction algorithm is semi-empirically determined, and may for example be a simple linear function, or an exponential function, a power law and so forth. In practice, one or other of the algorithms is applied, depending upon the complexity of the problem; this process is known as internal normalisation.

Of the two procedures, the in situ fractionation correction technique is generally preferred because it gives access to an absolute isotope abundance ratio rather than a relative deviation of a sample from a standard. It provides a number of further advantages, particularly when employing laser ablation measurements and has proved useful for ICP-MS Isotope Ratio experiments using magnetic sector mass analysers.

Whilst the in situ fractionation correction technique described above has proved robust in simple IRMS experiments employing an ICP source and a magnetic sector analyser, the addition of a prefilter and collision cell raises concerns over the effectiveness of the existing mathematical fractionation correction algorithms. In particular, the more complex ion optical setup presents a risk that unpredictable mass fractionations may occur, which would not be corrected for by the application of such mathematical fractionation correction algorithms. Indeed, the inventors have discovered that, even after internal normalisation has been applied, a deviation of several percent can be identified when employing an RF prefilter and collision cell. The effect is amplified as the width of the transmitted mass window of the RF prefilter becomes narrower. Expected levels of precision and accuracy for MR-ICP-MS are of the order of parts per million, so that systematic errors of a few percent are around 3 orders of magnitude higher.

One option, in order to improve the precision and accuracy of the isotope ratio measurements acquired using a prefilter and collision cell, would be to try to calibrate the transmission characteristic by measuring a standard and applying a correction factor to each ratio. Such a procedure would however require maintenance of a stable and constant tuning parameter of the quadrupole mass filter, during a measurement session. This is feasible in principle, but places another significant demand on the system. Because the systematic shift in the measured isotope ratio (relative to the actual isotope ratio) is highly dependent upon the width of the mass window of the prefilter, regular recalibration is required and the continuous attention of a user/operator is needed.

Against this background, in one aspect the present invention seeks to provide an improved mass filter for a mass spectrometer and an improved mass spectrometer comprising such a mass filter. An improved method of mass spectrometry is also sought using such a mass filter.

In a further aspect the present invention seeks to provide an improved IRMS. An improved method of isotope ratio mass spectrometry is also sought.

SUMMARY OF THE INVENTION

According to a first aspect of the present invention, there is provided a static field mass filter for a mass spectrometer, in accordance with this disclosure. According to another aspect of the present invention, there are provided mass spectrometers including a static field mass filter.

The invention also extends to a method of mass spectrometry, which is a method of isotope ratio mass spectrometry.

Static field mass filters may maintain a constant electric field and must contain a magnetic field. This leads to a flat transmission of ions across a selected mass-to-charge ratio range and small deviations in system tuning do not change the measured isotope ratio in an unpredictable way.

The static field mass filter is able to select a mass window prior to entry of the ions into the reaction cell. Although masses are separated by static magnetic and electric fields in accordance with the present invention, the complete arrangement of the ion optical pre filter setup does not introduce a lateral mass discrimination for the selected m/z window at the relatively small input aperture of an reaction cell (in a typical non limiting preferred embodiment, the reaction cell is a collision cell having an entrance aperture whose dimensions are in the region of 2 mm).

In contrast to RF based mass filter technology, the static field mass filter works perfectly well with wide aperture high ion beam energy (typically KeV range) ion optics which ensures high transmission and thus high sensitivity of the complete mass spectrometer.

Preferably, the mass spectrometer is an isotope ratio mass spectrometer.

In a particularly preferred embodiment, the static field mass filter comprises an ion optical arrangement including two or more Wien filters. Most preferably, the static field mass filter comprises first and second Wien filters with an intermediate focus between each. Mass filtering occurs at an aperture between the first and the second Wien filters. This arrangement uses static and not time dependent (RF based) ion optics to separate the ions, yet, as a result of the symmetry between the first and second Wien filters and the use of an inversion lens, mass-to-charge separation introduced within the static field mass filter is nullified at the exit thereof.

The resulting instrument may easily be tuned along the path of the ions, because there is a simple relationship between the electric and magnetic fields, and the mass to charge ratio of the ions. Internal normalisation algorithms for mass fractionation correction can thus be applied to achieve accurate results.

In a quadrupole mass filter only ions of the m/z window pass the quadrupoles over the full length of the filter. Resonance effects of the applied RF may disturb the separation of ions of the of the m/z window.

In the mass filter according to embodiments of the present invention, the ions are only separated by the aperture of the diaphragm, a specific position along the longitudinal symmetry axis located between the first and the second Wien filter.

The high stability static ion optics permits high precision, high accuracy isotope ratio measurements. There is an inherent robustness against small drifts of instrument parameters with the symmetrical double Wien filter arrangement, because the same controller can be employed for both the magnetic and the electric fields. This means that any instability arising in a first of the Wien filters occurs equally in the second of the Wien filters, and the arrangement of the static field mass filter with first and second Wien filters separated by an inverting lens thus allows the instabilities in the Wien filters to cancel each other out.

Another advantage of the static field mass filter of the present invention is that it employs high ion energy ion optics (of the order KeV). This contrasts with RF mass filters that employ low energy ion optics. High energy ion optics provides for improved focusing conditions, leading to higher ion transmission. There is higher robustness against space charge—in ICP-MS, for example, there is an intense argon ion beam at the entrance to the pre-filter. Where the pre-filter is—in accordance with this invention—a static field mass filter, the resulting ability to employ higher ion beam energies reduces the effect of space charge which in turn reduces the degree of mass discrimination.

Higher ion energies also provide higher matrix robustness, particularly in the case of laser ablation, again as a result of reduced space charge effects.

In the static field mass filter of embodiments of the present invention, the ions are spread over their mass-to-charge ratio in the direction transverse to the flight direction (z-direction) of the ions. This avoids the mixing the of flight paths of ions in the direction transverse to the flight direction, which is a consequence of the use of quadrupole mass filters.

Further advantages and preferred arrangements will become apparent upon review of the following description and drawings, and from the accompanying claims.

BRIEF DESCRIPTION OF THE DRAWINGS

The invention may be put into practice in a number of ways, some of which will now be described by way of example only and with reference to the accompanying drawings in which.

DETAILED DESCRIPTION OF A PREFERRED EMBODIMENT

Figure 1:
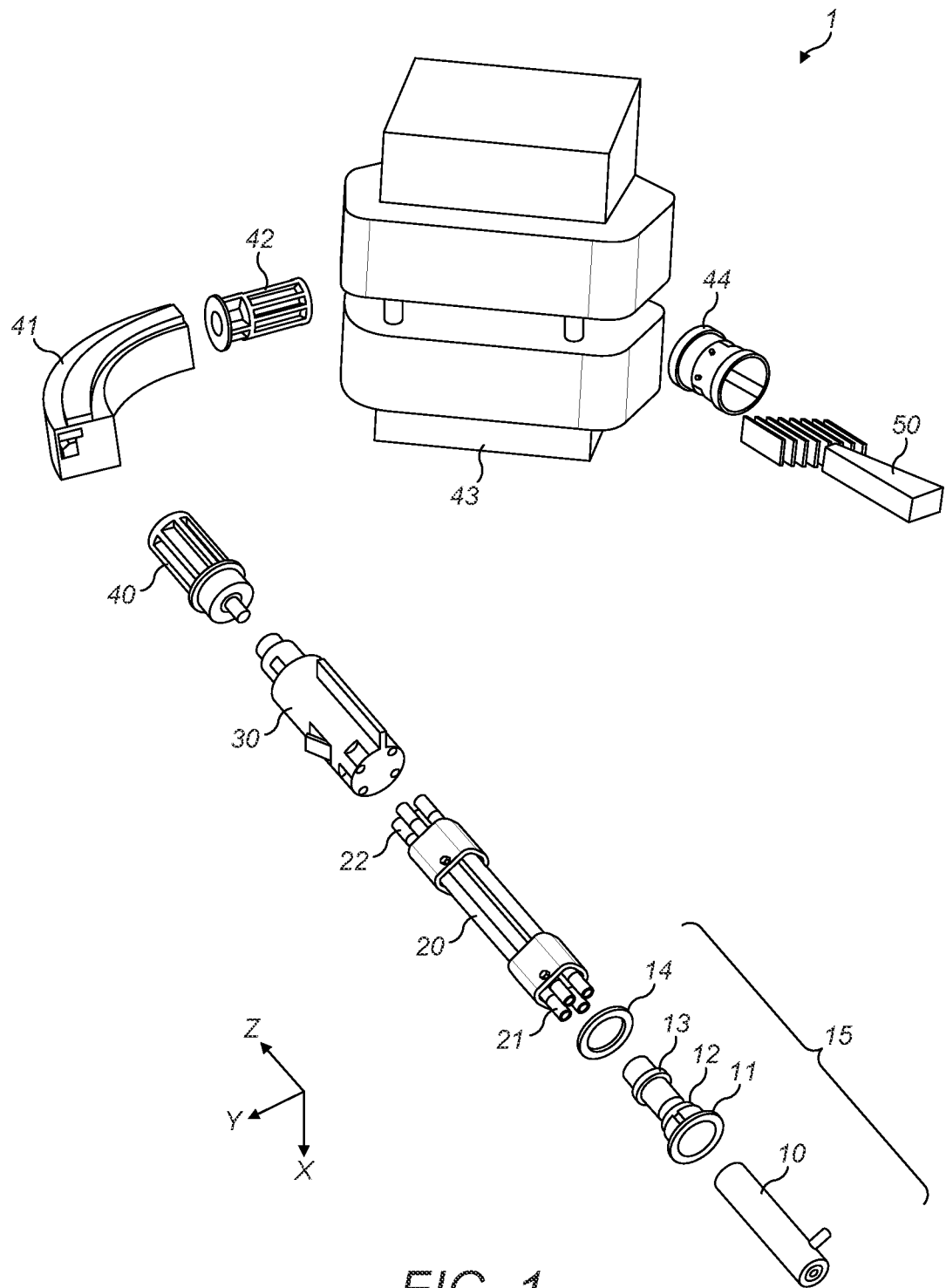
FIG. 1 shows a schematic view of a prior art isotope ratio mass spectrometer (IRMS) including an RF quadrupole mass filter as a pre-filter and a collision cell.

FIG. 1 shows a schematic view of a prior art isotope ratio mass spectrometer (IRMS) 1, of the type described in the above referenced WO-A-2017/029200. The IRMS 1 has a triaxial ICP torch 10, a sampler cone 11, one or more skimmer cones 12, an extraction lens 13 and/or a further skimmer cone 14 and/or another ion optical device. Together these components form an inductively coupled plasma (ICP) ion source 15 which generates a collimated ion beam.

Downstream of the ion source is a quadrupole (RF) mass filter 20 having a preliminary filter 21 upstream of the quadrupole (RF) mass filter 20. The mass filter 20 has an entrance aperture into which the ion beam is directed. Ions leaving the RF mass filter 20 pass through a post filter 22 and then enter a collision cell 30, such as an HCD (high energy dissociation) cell, which may be heated to around 100-200° C.

Following the collision cell 30, ions are accelerated by an accelerator 40 which accelerates the ions. The accelerated ions are focussed into the ion optics of a double focusing high resolution multicollector mass spectrometer so that multiple different ion species (eg different analyte isotopes and/or standard isotopes for calibration etc) can be detected simultaneously.

The double focusing high resolution multicollector mass spectrometer includes an electrostatic sector 41 and a magnetostatic sector 43 varying its static field, separated by a focussing lens 42. The electrostatic sector 41 disperses ions by their energy and thus provides focusing for ions of the same energy. The magnetostatic sector 43 disperses ions by mass (strictly, by mass to charge ratio m/z). The electrostatic and magnetostatic sectors can be arranged in a so called Nier-Johnson geometry with scanning of the magnetic flux density of the magnetostatic sector 32 in order to allow sequential focusing of ions having different m/z ratios.

Downstream of the magnetic sector 43 is a set of dispersion optics 44 whose purpose is to change the mass dispersion and improve peak detection. The IRMS 1 also contains a detector platform 50 such as that described, for example, in GB-A-2,541,391, with 9 Faraday cups and up to 8 ion counters.

In the IRMS 1 described above, by tuning the amplitude of the RF voltages and the DC voltage offsets of the RF voltages applied to the RF mass filter 20, different ion species can be selected for onward transmission to the collision cell 30. For example, the parameters of the RF mass filter 20 can be set so as to pass ion species across a full range of m/z of the ions generated by the ion source 15 of the IRMS 1 (full transmission). In that case the RF mass filter 20 acts as an RF lens to focus the ions before they enter the collision cell 30.

Alternative voltages and frequencies can be applied to the RF mass filter 20 so as to permit selection of a m/z window, that is to say, a range of ion species across a window of m/z values contained within the wider range of m/z generated by the ion source. The width (that is, the range between the ions of the highest and lowest m/z) and the location (that is, the m/z value of the centre of the mass window) within the full mass range generated by the ion source 15 can then be set.

The advantage of the RF mass filter 20 is that the all ions of the ion beam of the selected m/z window exiting the RF mass filter 20 follow the same ion optical path and are not separated in space, like in magnetic sector instruments when exiting the quadrupole mass filter. The selected ions always exit the RF mass filter 20 through the same RF mass filter exit aperture, and have almost no lateral mass dispersion. This is fundamentally different from magnetic sector instruments, where the mass discrimination is based on separating different masses in space. The fact that there is no lateral mass dispersion makes the RF mass filter 20 ideally suited to be coupled with the collision cell 30, since it ensures that all ions leaving the RF mass filter 20 follow the same ion optical path. This in turn means that, at least in a first order there is only limited mass discrimination at the small entrance aperture (typical 2 mm diameter) to the high pressure collision cell 30. Thus an RF-based pre filter seems to be the appropriate solution for many applications.

However, a major limitation of this setup for high precision and accurate isotope ratio analysis is the "noding effect" which occurs more or less with every RF lens. RF mass lenses rely on alternating strong focusing and defocusing RF-cycles inside the RF lens. For those ions which are rejected by the RF mass filter 20, the defocusing action of the RF lens dominates and forces the ion trajectories to instability. As a result of this instability, the ions do not leave the quadrupole filter through the exit aperture, but rather contact the quadrupoles of the quadrupole filter. These ions are discharged, adsorbed or bonded at the struck quadrupole rod. For those ions which are transmitted by the RF mass filter, however, the focusing action prevails, and the ion trajectories are stable, focusing the transmitted ions to the exit aperture.

Figure 2:
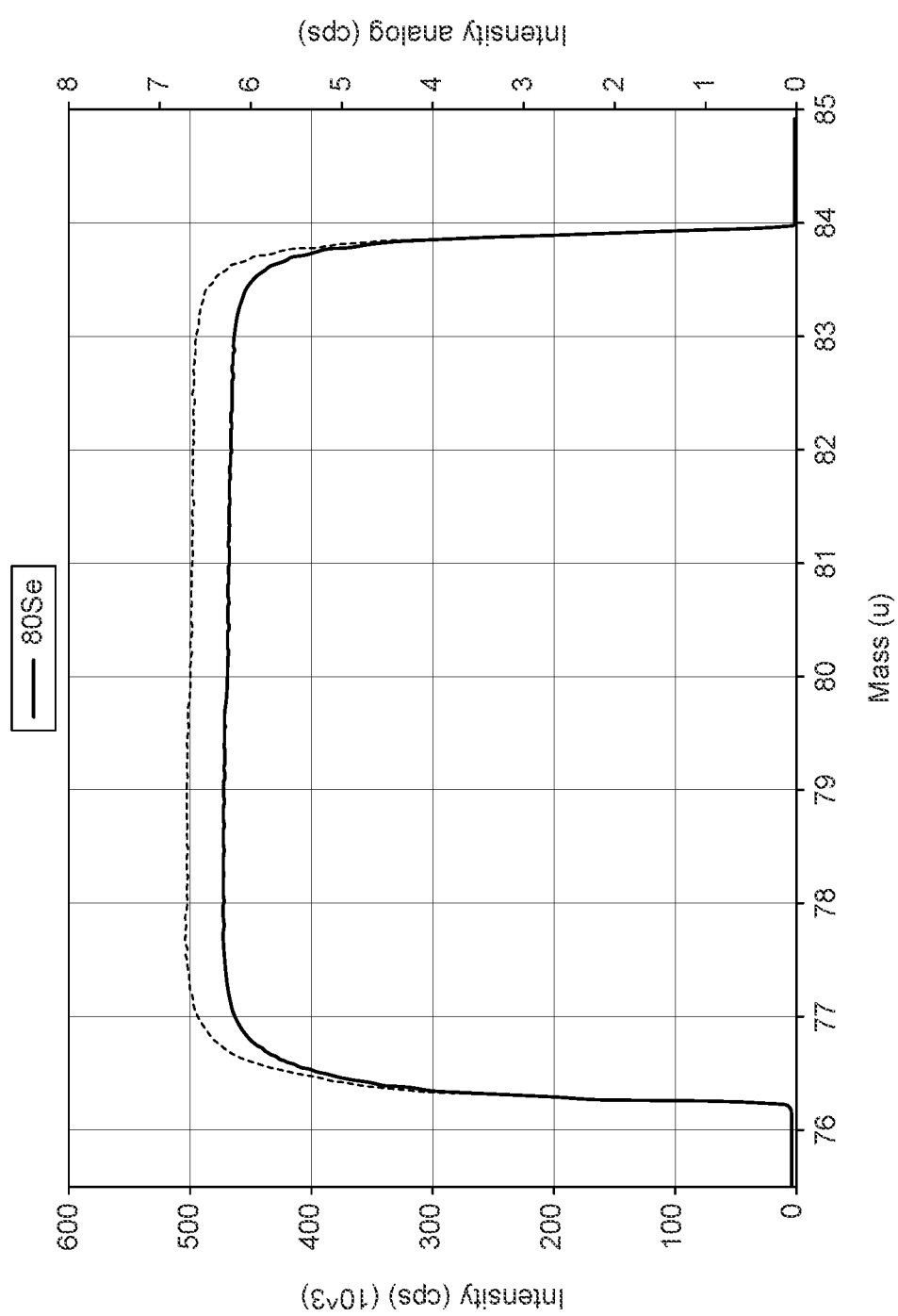
FIG. 2 shows a plot of intensity versus mass to charge ratio using an IRMS in accordance with FIG. 1.

FIG. 2 shows the results from an experiment in which the mass window of a quadrupole mass filter has been selected to be about 8 u wide and there is only one peak major peak at mass 80 in the mass spectrum. In FIG. 2, the peak is a result of an Ar dimer ($^{40}Ar^{40}Ar$) which is formed in the ICP torch 10 of the ion source. The centre of the mass window has been scanned from mass 75$u$ to mass 85$u$, in order to determine the uniformity of the mass response of the mass window, when the RF mass filter is scanned. The two lines that can be discerned in FIG. 2 are the result of carrying out the experiment twice, at different RF mass filter 20 tunings.

FIG. 2 shows that the peak steepness is less than 1 u on the rising and the falling edges. The flatness of the peak in the mass range from 78 u to 83 u appears to be flat on a linear scale, which is good enough for many applications.

In order to explore the effect of noding in the apparatus of FIG. 1, a Nd standard was introduced into the ICP torch 10. The isotope ratios of 142Nd/146Nd and 150Nd/146Nd were then measured using the detector platform 50, while the DC pole bias of the RF mass filter 20 was changed slightly.

Figure 3:
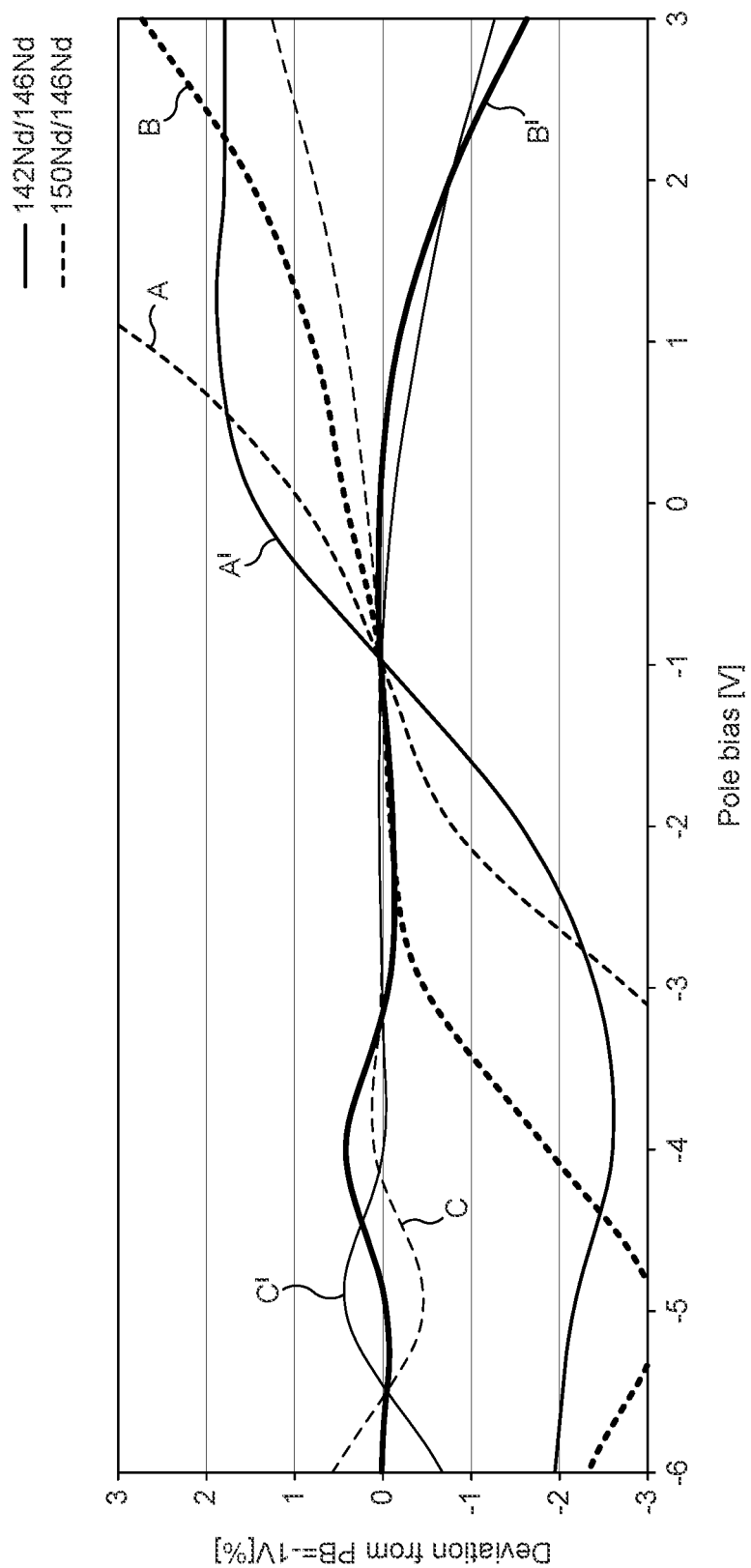
FIG. 3 shows a plot of the stability of isotope ratio measurements of two different isotopes of Neodymium, versus DC quadrupole pole bias, for different mass windows of the RF quadrupole of FIG. 1.

FIG. 3 shows a plot of the stability of the isotope ratios, with the width of the mass window selected by the RF mass filter 20 selected to be 10 u wide, 16 u wide and finally full width. The solid lines in FIG. 3 represent a plot of the ratio of 142Nd/146Nd and the dashed lines in FIG. 3 represent a plot of the ratio of 150Nd/146Nd. The lines labelled A and A' represent a wide window of 10 u, the lines labelled B and B' represent a wider window of 16 u, and the lines labelled C and C' represent a full mass window (no filtering).

Oscillations of the measured isotope ratio are clearly visible. These are dependent upon instrument tuning. They indicate that the transmission for the different masses depends on the DC pole bias of the quadrupole, and the size of the oscillations also depends on the mass window which is selected. The pole bias determines the energy of the ions as they travel through the RF mass filter 20. The oscillations of the transmissions are mass dependent and do not occur with the same phase for each mass. Depending on the pole bias adjustment, some ions will have a higher transmission rate and others will have a lower transmission rate. The systematics of this strongly depends upon the tuning settings, and these oscillations disturb the simple use of the internal normalization approach described in the introduction above, to correct for mass discriminations.

Without any pre filtering (full mass window, the lines labelled C and C' in FIG. 3), the stability of the measured isotope ratios at different DC pole biases is substantially flat in the range of −1V to −3V. In case of the 16 u wide mass window (lines B and B'), the situation is similar but the curvature of the curve is greater. For the narrowest of the three mass windows (10 u; lines A and A'), the deviation increases to several percent, depending on tuning. This is a result of effects caused by the rounding of the transmission curve characteristics at the edges of the transmission window. Noding effects are magnified at the edges of the transmission profile and result in a periodic oscillation of the expected plateau shown in FIG. 2 of transmitted ions. Due to this noding effect, the precision of the IRMS results can be reduced.

Figure 4:
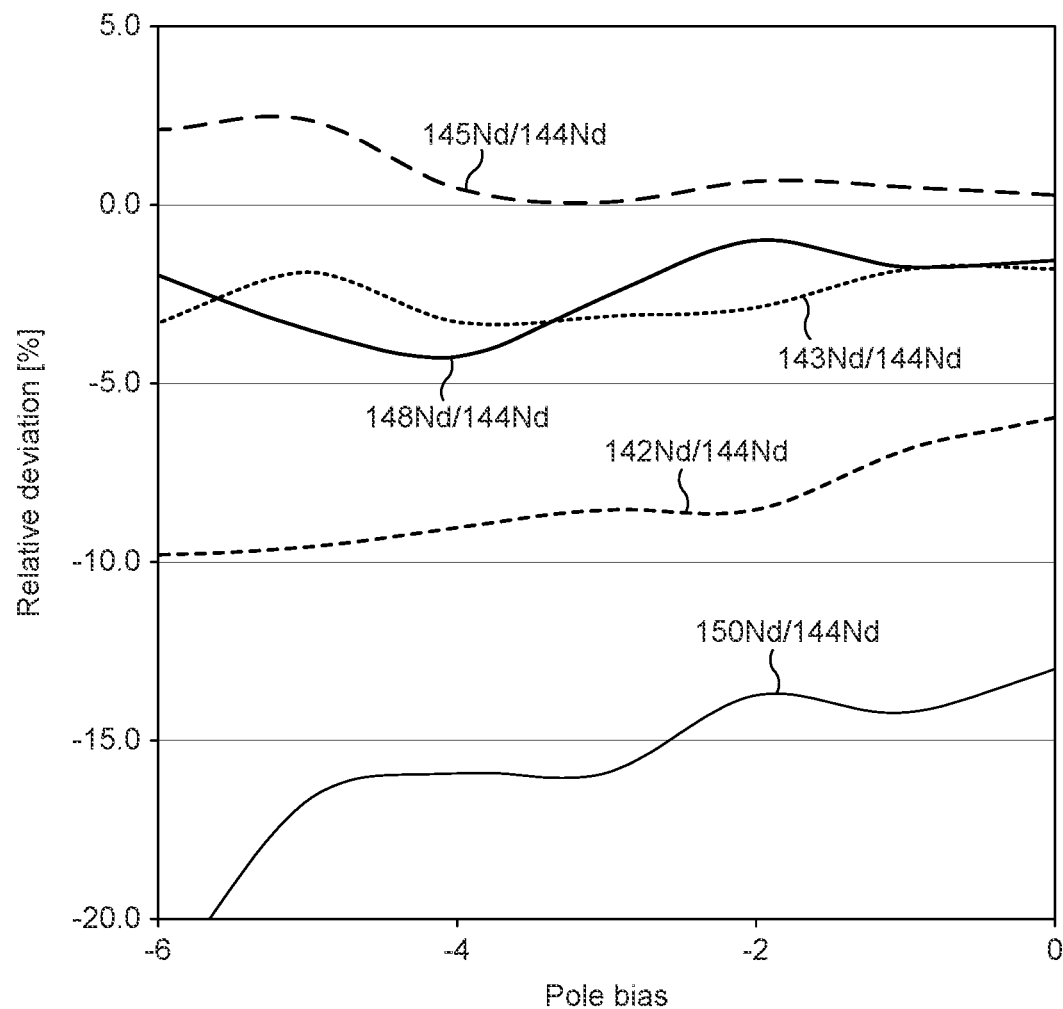
FIG. 4 shows a plot of the stability of isotope ratio measurements of various isotopes of Neodymium, versus DC quadrupole pole bias, for the RF quadrupole of FIG. 1, following internal normalisation.

A similar experiment was carried out using the apparatus of FIG. 1, to investigate the change of all Nd isotope ratios for one mass window setting at different DC pole biases. The results are shown in FIG. 4. The noding of the isotope ratios at different pole biases is clearly visible. The displayed isotope ratios have been internally normalized to the normalizing ratio of 146/144 Nd. The deviations plotted on the y-axis describe the deviation of the measured ratio versus the true ratio. In this case, the measured isotope ratios deviate from the true isotope ratios by several percent, even after internal normalization. This is an extreme example of how the tuning of the RF mass filter 20 can influence the accuracy of the measured isotope ratios. The noding effect of the RF mass filter 20 can result into inaccuracies in the range of several percent, even with internal normalization.

Figure 5:
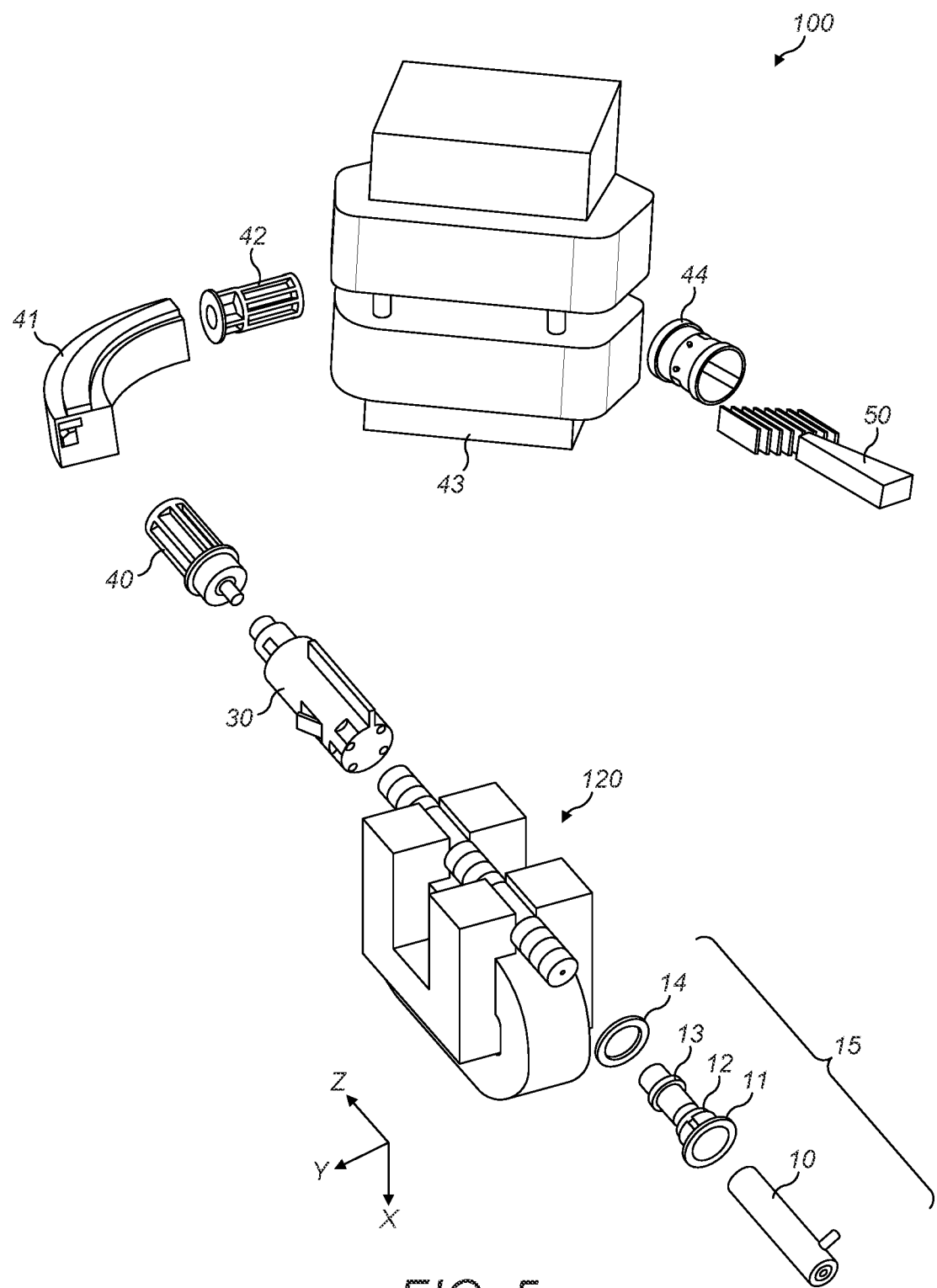
FIG. 5 shows an IRMS in accordance with an embodiment of the present invention, including a static field mass filter as a prefilter.

To address these problems of noding, an IRMS in accordance with an embodiment of the present invention is shown in FIG. 5. The arrangement of FIG. 5 includes a number of components shared with those in FIG. 1, which are labelled with like reference numbers.

The IRMS 100 of FIG. 5 includes an ion source 15 which is configured in similar manner to the ion source of FIG. 1 and will not therefore be described in detail. The ion source 15 includes a triaxial ICP torch 10, a sampler cone 11, one or more skimmer cones 12, an extraction lens 13 and/or a further skimmer cone 14 and/or another ion optical device 14. This results in a collimated ion beam.

Downstream of the ion source 15, instead of a quadrupole (RF) mass filter, is positioned a static field mass filter 120 which will be described in further detail below. The static field mass filter 120 maintains constant electric and magnetic fields, so that transmission of ions through the static field mass filter has a flat response across the selected m/z range. A quadrupole mass filter does not provide such a flat response. This is because the ions are only influenced by static fields. In a quadrupole mass filter, the electromagnetic fields change with time according to the applied frequency. This results in a zig zag trajectory of the ions which are pushed back and forth. Moreover, small deviations in system tuning of the static field mass filter 120 do not change the measured isotope ratio in an unpredictable way. Nevertheless, the static field mass filter 120 of FIG. 5 does not introduce a lateral mass discrimination (as would happen in, for example, a magnetic sector analyser) so that the ion beam exiting the static field mass filter 120 can be focussed onto the relatively small (c. 2 mm) entrance aperture of a collision cell 30, across the width of the mass window selected for transmission by the static field mass filter 120.

As in the arrangement of FIG. 1, following the collision cell 30, ions are accelerated by an accelerator 40 and focussed into the ion optics of a double focusing high resolution multicollector mass spectrometer for simultaneous detection of different isotopes (of the sample or standards). Further, the double focusing high resolution multicollector mass spectrometer again includes an electrostatic sector 41 and a magnetostatic sector 43, separated by a focussing lens 42, and since these were already described in respect of FIG. 1, their specific arrangement and purpose will not be repeated here. Downstream of the high resolution multicollector mass spectrometer, the arrangement of FIG. 5 contains dispersion optics 44 and finally a detector platform 50 again, for example, such as that described in GB-A-2, 541,391.

The preferred arrangement of a static field mass filter 120 in the arrangement of FIG. 5 is a double Wien filter. Wien filters employ an arrangement of crossed electrostatic and magnetostatic fields. Ions passing through this arrangement are subject to the magnetic Lorentz force and the electric field strength in accordance with the following equations:

$$\vec{F}_{electric} = q \cdot \vec{E}$$

$$\vec{F}_{Lorentz} = q \cdot \vec{v} \cdot \vec{B}$$

where q is the electric charge of the ion, v is the velocity of the ion, $\vec{E}$ is the electric field and $\vec{B}$ is the magnetic flux density. In the case that the initial ion beam velocity is perpendicular to both fields and both fields are perpendicular to each other, this gives, for the axial trajectory, the following condition:

$$\vec{F}_{electric} = \vec{F}_{Lorentz}$$
$$q \cdot \vec{E} = q \cdot v \cdot \vec{B}$$
$$v = \frac{|\vec{E}|}{|\vec{B}|}$$

Figure 6:
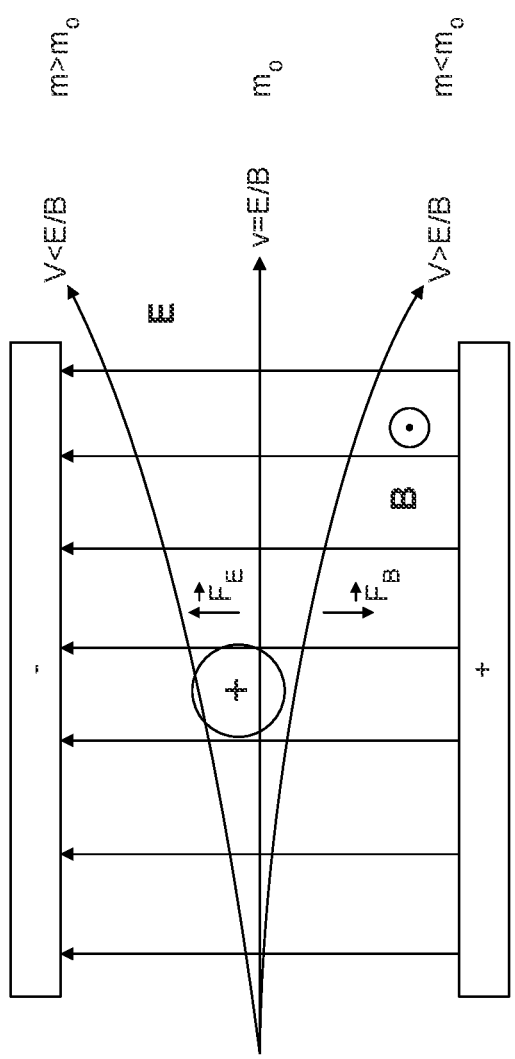
FIG. 6 shows, highly schematically, an arrangement of a Wien filter employed as part of the static field mass filter of FIG. 5, to illustrate the effect of magnetic and electric fields on ions of velocity v.

In other words, the Wien filter is a velocity filter. It deflects charged particles according to their velocity. Ions with the same ion energy are separated by the square root of their mass (because the kinetic energy of an ion is ½ mv²). Lighter ions travel faster, for a given ion energy, than heavier ions, and, as such, lighter ions are deflected more in the crossed electric and magnetic fields than heavier ions. This is why the Wien filter also acts as a mass separator. So, in a Wien filter, masses are separated in space. The principle is illustrated in highly schematic form in FIG. 6, where those ions having a velocity v equal to E/B are allowed to pass through undeviated, whereas ions of different velocities not equal to E/B are caused to bend under the influence of the crossed E and B fields so that the ions are separated out. Ions may be shown to deviate from the Z axis in an orthogonal direction X, by a distance ΔX that is given by $$\Delta X = \frac{1}{4} \frac{ql^2}{E_{kin}} \left( E - \sqrt{\frac{2E_{kin}}{m}} B \right) \quad (1)$$

where q is the charge of the ion, l is the length of the Wien filter in the Z direction, $E_{kin}$ is the kinetic energy of the ion, m is the mass of the ion, and E and B are the electric field and magnetic flux density respectively. For singly charged ions of the same incident energy, the expression above can be simplified to $$\Delta X = C_1 - C_2 B m^{-1/2}$$

In other words, for given crossed electric and magnetic field strengths, the deviation from the Z axis in a Wien filter of fixed length l is related to the inverse square root of the mass of an ion travelling through it. The magnetic flux density and electric fields are kept constant during isotope ratio measurement. In order to adjust the Wien filter so as to select ions of different masses, either $\vec{E}$ or $\vec{B}$ may be adjusted. In practice, for small changes in the selected mass, the magnetic flux density is kept constant (eg at 0.5T) and the electric field is adjusted. For analysis of larger masses—such as Uranium for example—it is generally desirable to adjust the magnetic flux density to a higher values such as 1 or 1.5T. One of the reasons for this is that a higher magnetic flux density results in a higher mass dispersion to counteract the decrease of the mass dispersion with higher m/z values (which happens for a constant magnetic flux density). Thus, adjusting the value of magnetic flux density allows the desired mass dispersion in turn to be selected.

Figure 7:
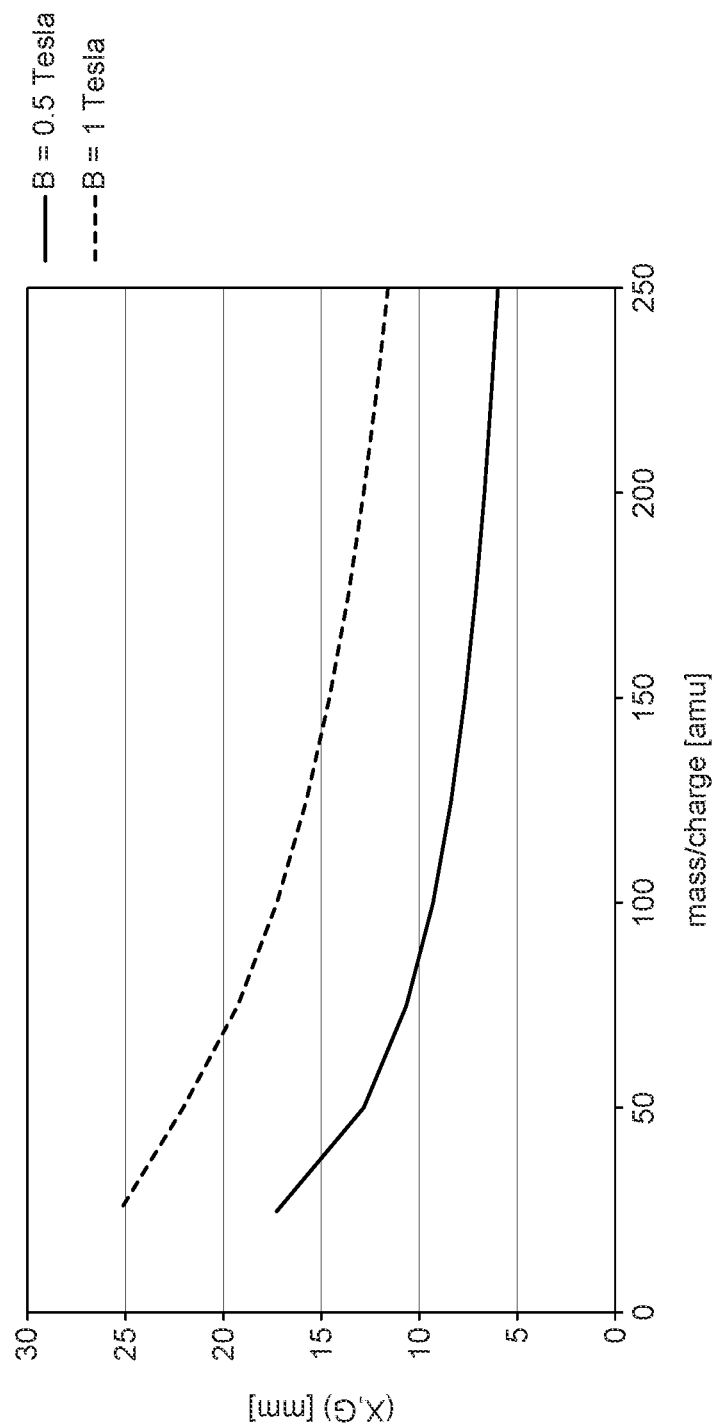
FIG. 7 shows a plot of mass dispersion against mass to charge ratio for different applied magnetic field strengths, in a Wien filter.

FIG. 7 shows an example of a plot of the dispersion coefficient (X,G) versus mass to charge ratio m/z in amu, for a Wien filter of length 70 mm, and an ion energy of 2 keV. The dispersion coefficient (X,G) links the ion displacement X of an ion of mass M relative to a central mass $M_0$ as $X = (X,G) * (M - M_0)/M_0$.

The solid line represents an applied magnetic flux density of 0.5T and the broken (dashed) line represents an applied magnetic flux density of 1.0T. To calculate the actual deflection of the ion beam, the dispersion coefficient must be multiplied by the relative mass deviation. So for a relative mass deviation of 10%, the actual displacement X=[(X,G)*0.1] mm. For an applied magnetic field strength of 0.5T, ions at m/z around 90 amu will be deflected about 1 mm (10*0.1), whilst ions of m/z around 60 amu will be deflected around 2 mm when an applied magnetic field strength of 1.0T is applied. As will be understood from FIG. 6, the dispersion at a point downstream of the Wien filter will be greater than that at the exit to the Wien filter, because the ions are at that point travelling along a trajectory that diverges from the central axis.

Figure 8:
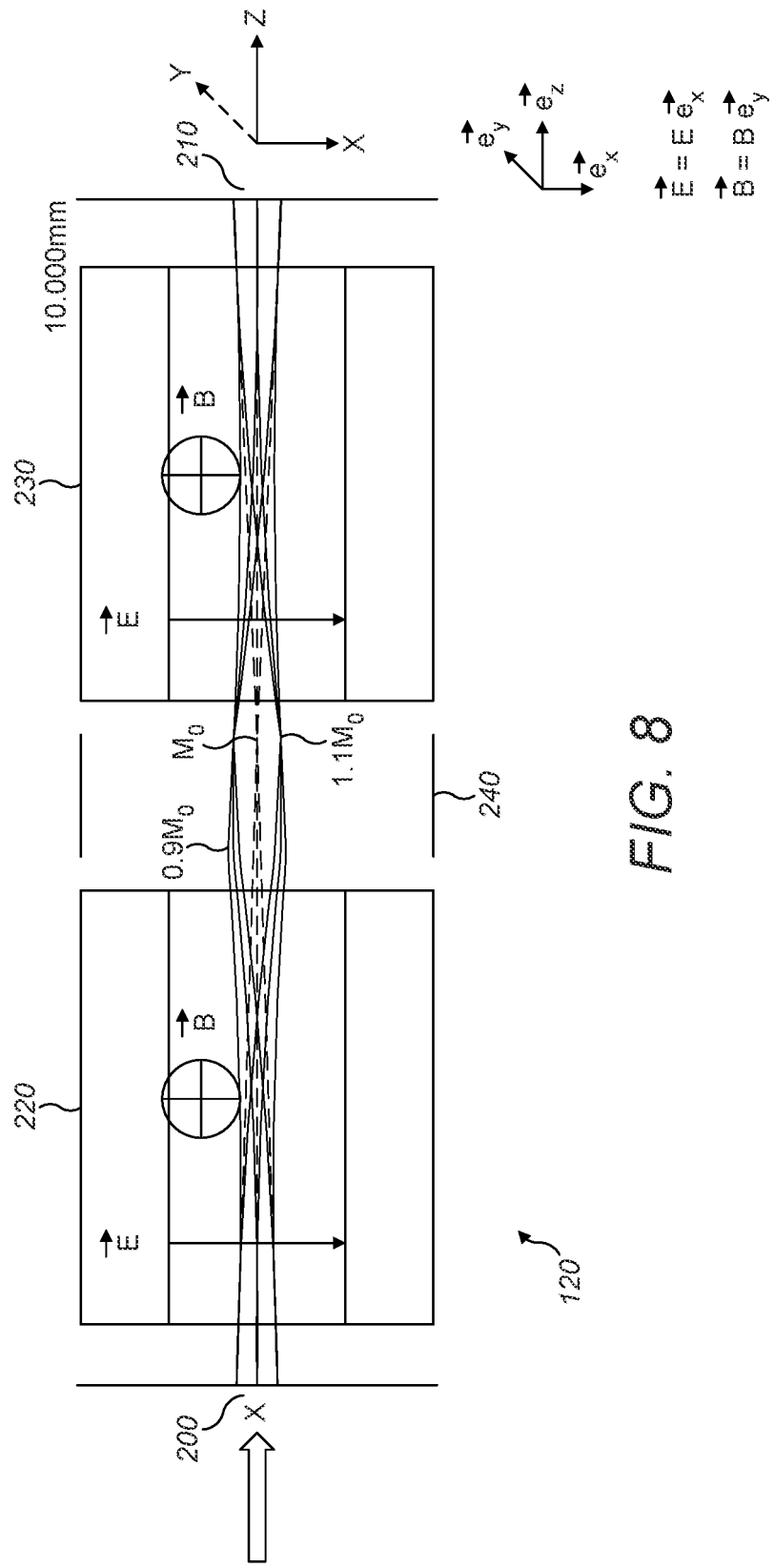
FIG. 8 shows a schematic view, in the X-Z plane, of a first embodiment of the static field mass filter of FIG. 5, comprising first and second Wien filters separated by an inversion lens, along with simulated ion trajectories in the X-Z plane.

FIG. 8 shows a more detailed schematic view of the static field mass filter 120 of FIG. 5, in the plane X-Z of FIG. 5 wherein the vector of the magnetic flux density is pointing into the Y-direction which is perpendicular to the plane of the drawing. The static field mass filter 120 comprises entrance and exit apertures 200, 210. The entrance aperture 200 has a typical diameter of around 2 mm. Adjacent to the entrance aperture 200, within the static field mass filter 120, is located a first Wien filter 220. A second Wien filter 230 is located downstream of the first Wien filter 220, within the static field mass filter 120, and adjacent to the exit aperture 210.

An inversion lens 240 is positioned between the first and second Wien filters 220, 230.

The trajectories of ions passing from left to right through the double Wien filter arrangement have been simulated and are also shown in FIG. 8. For simplicity, angular divergence (assuming a collimated ion beam at the entrance aperture) and energy spread are ignored. Three parallel beam paths (no divergence) are shown to the left of FIG. 8, entering the entrance aperture 200 of the static field mass filter. The ion beam energy is 2 KeV and three different ion mass to charge ratios are employed, with masses $M_0$, 0.9 $M_0$ and 1.1 $M_0$. This reflects a mass spread of +/−10%. The orientation of the magnetic flux density is perpendicular to the plane of the paper (that is, in the Y direction of FIG. 5), whilst the direction of the electric field is in the X direction (parallel to the plane of the paper).

The lighter ions of m/z=0.9 $M_0$ are deflected in the negative X direction by the first Wien filter 220, whilst the heavier ions of m/z=1.1 $M_0$ are deflected in the positive X direction by the first Wien filter 220. The electric field and magnetic flux density are adjusted until ions of m/z $M_0$ travel along the symmetry axis (the Z axis in FIGS. 5 and 8) of the static field mass filter 120.

The inversion lens 240 inverts the deflection angles introduced by the first Wien filter 220. In other words, the lighter ions of m/z=0.9$M_0$ and the heavier ions of m/z=1.1 $M_0$ are both bent back towards the central symmetric axis Z, in proportion to the amount of deviation introduced by the first Wien filter 220. Ions of m/z=$M_0$ pass straight through the inversion lens 240, substantially without deviation in the X direction.

The ions of the various m/z thus converge downstream of the inversion lens 240 into the second Wien filter 230. The electric field and magnetic flux density of the second Wien filter are orientated identically to those in the first Wien filter, so once again, the lighter ions (m/z=0.9$M_0$) are deflected in the negative X direction by the second Wien filter 230, whilst the heavier ions of m/z=1.1 $M_0$ are deflected in the positive X direction by the second Wien filter 220. As a consequence of the configuration of the static field mass filter with first and second Wien filters separated by an inverting lens, the spatial distribution of ions at the entrance aperture 200 is imaged onto the exit aperture 210, with a collimated (nearly parallel) beam of ions at the plane of the exit aperture 210 of the static field mass filter 120. Thus, angular focusing of a collimated ion beam at the entrance aperture 200 is preserved at the exit plane of the static field mass filter 120 of FIG. 8, regardless of mass. In mathematical terms, the spatial focusing (at least in first order), along with the mass dispersion focusing, may be expressed as $$\frac{dx}{d\gamma} = \frac{d\alpha}{d\gamma} = 0$$

where
x is the spatial displacement from the Z axis;
α is the angular divergence from the Z axis; and
γ is the relative mass difference of the ion beams.

In the ideal case of an optimized collimated ion beam at the entrance aperture, preferably the values $$\frac{dx}{d\gamma} \text{ and } \frac{d\alpha}{d\gamma}$$

of the ion beam at the entrance aperture 200 and exit aperture 210 remain unchanged or nearly unchanged. So the relative difference between one or both of these values at the entrance aperture 200 and exit aperture 210 is more than 10%, preferably not more than 2% and in particular preferably not more than 0.5%.

Typically the value of $$\frac{dx}{d\gamma}$$

at the exit aperture 210 is smaller than 0.2 mm, preferably smaller than 0.1 mm and particular preferably smaller than 0.05 mm for a filtered m/z window.

Typically the value of $$\frac{d\alpha}{d\gamma}$$

at the exit aperture 210 is smaller than 4°, preferably smaller than 2° and particular preferably smaller than 1° for a filtered m/z window.

The entrance aperture of the collision cell 30 is, as noted above, relatively small (c. 2 mm) and it is important that any angular distribution of ions arriving at that entrance aperture is minim/zed. The preservation of both spatial and angular focusing of the ions in the static field mass filter 120 of embodiments of the present invention is thus highly beneficial in ensuring that ions are not mass discriminated at the entrance plane of the collision cell, in accordance with their mass.

Figure 9A:
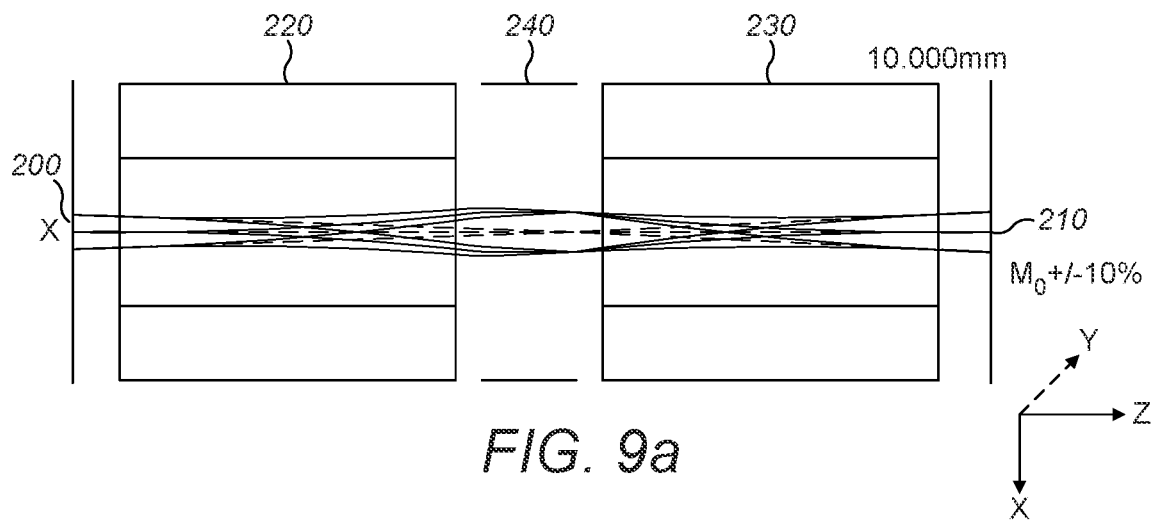
FIGS. 9a, 9b and 9c show simulated ion trajectories in the X-Z plane, in the arrangement of FIG. 8, with first, second and third mass spreads respectively.
Figure 9B:
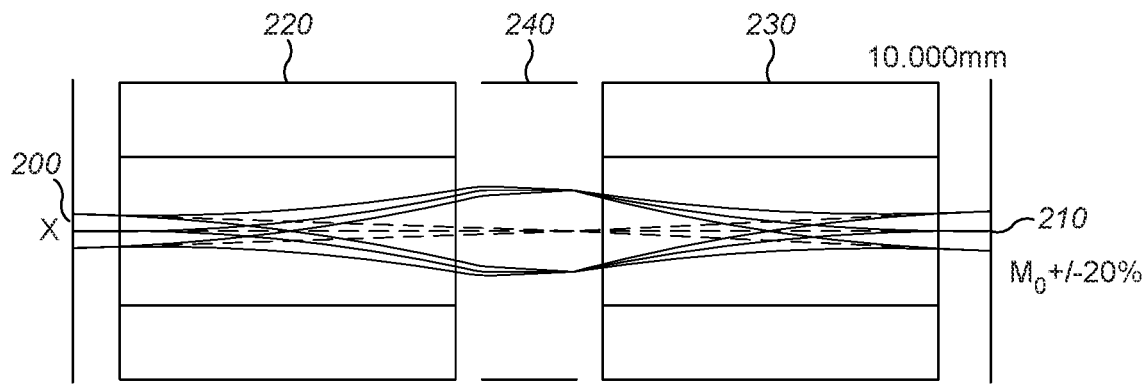
Figure 9C:
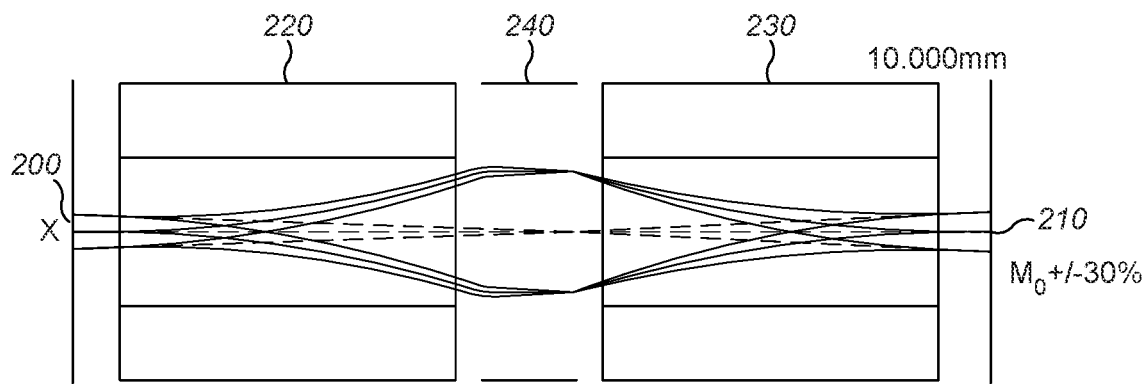

FIGS. 9a, 9b and 9c illustrate simulated ion trajectories through the static field mass filter 120 of FIG. 9, again in the X-Z plane of FIG. 5, for different mass ranges. In FIG. 9a, the mass window is $M_0$+/−10%, that is, FIGS. 9a and 8 are identical. FIG. 9b shows ion trajectories for a wider mass window $M_0$+/−20%, and FIG. 9c shows ion trajectories for a still wider mass window of $M_0$+/−30%.

As can be seen by comparison of FIGS. 9a, 9b and 9c, lateral mass dispersion (that is, dispersion in the X direction) is greatest at a point between the first and second Wien filters 220, 230, and, moreover, at that point the amount of ion dispersion increases with the width of the mass window. If a specific mass window is selected, only ions having a limited dispersion in the X direction between the two Wien filters should reach the second Wien filter.

Figure 10A:
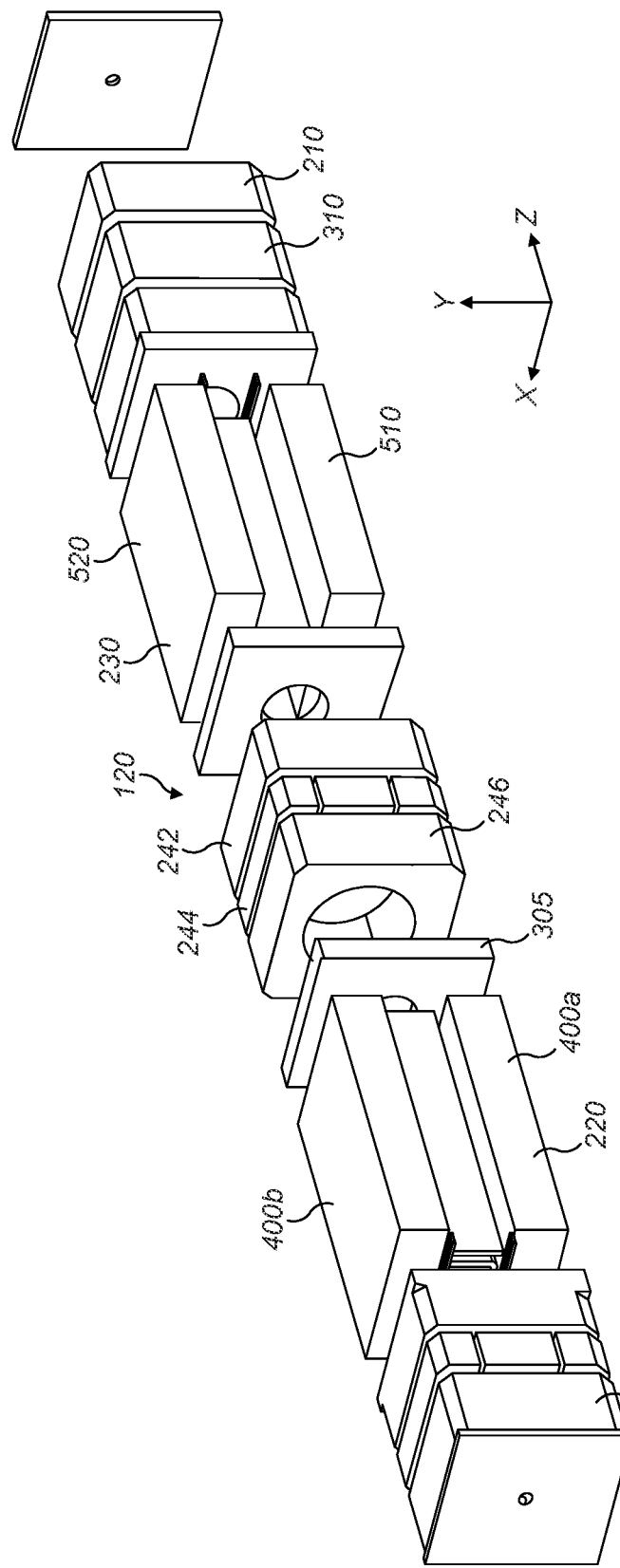
FIG. 10a shows a schematic side perspective view and FIGS. 10b and 10c show schematic views in the X-Z and Y-Z planes respectively of a second embodiment of the static field mass filter of FIG. 5, comprising first and second Wien filters separated by an inversion lens, along with simulated ion trajectories in those planes.
Figure 10B:
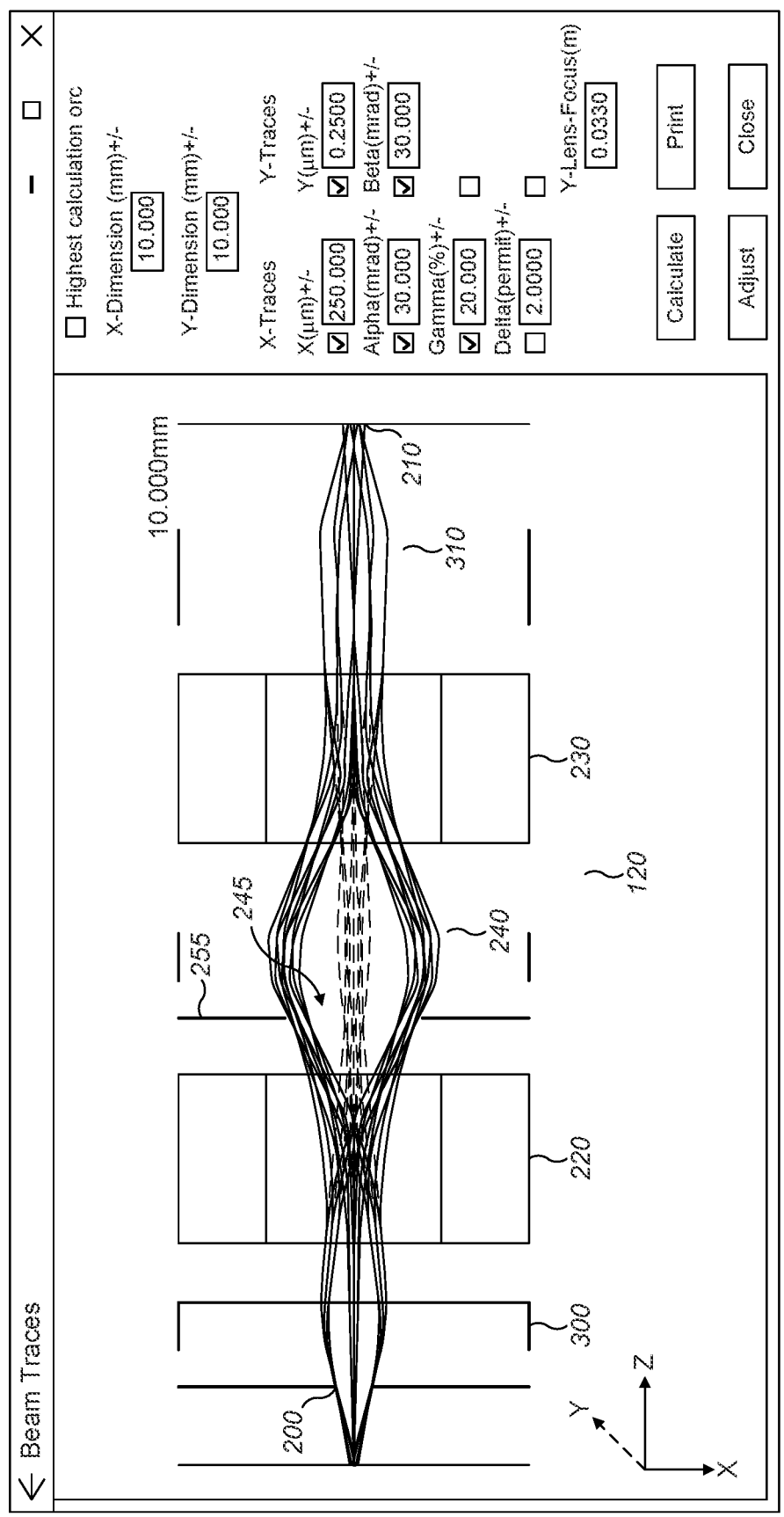
Figure 10C:
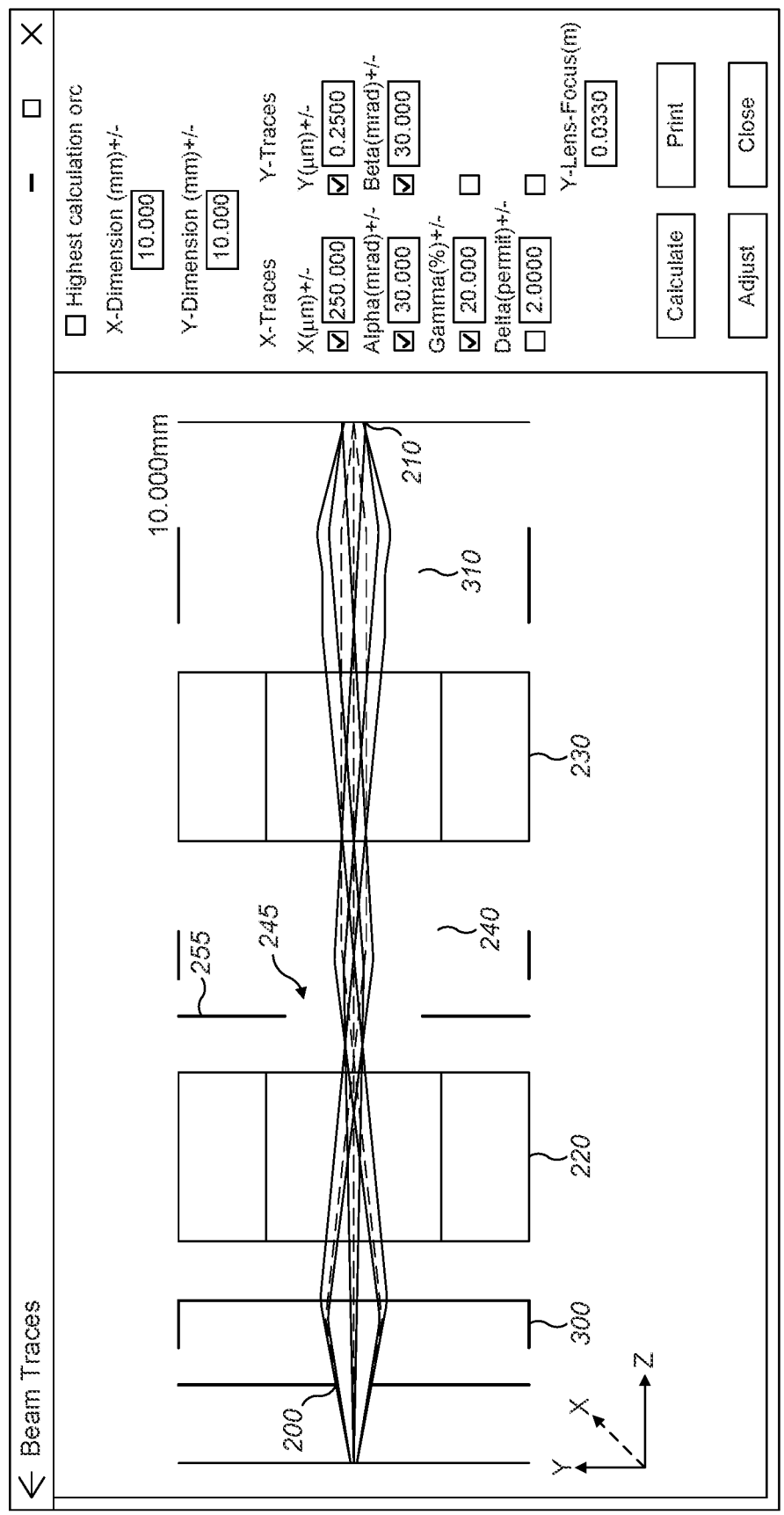

FIGS. 10a, 10b and 10c show an arrangement of a static field mass filter 120 in accordance with an alternative embodiment. FIG. 10a in particular shows a perspective side view of the static field mass filter 120, whilst FIG. 10b shows a section through the central axis of symmetry in the X-Z plane (same plane as FIGS. 6, 8 and 9a, 9b and 9c)

along with ion trajectory simulations. FIG. 10c shows the static field mass filter 120 in the orthogonal (Y-Z) plane, again with ion trajectory simulations. Features common to the embodiments of FIGS. 8 and 10a/10b/10c are labelled with like reference numbers. In FIGS. 10a, 10b and 10c, ions travel from left to right. The ion beam energy is 2 KeV, and the static field mass filter 120 has an entrance aperture 200 which is circular with a 2 mm diameter.

Ions travel through an entrance lens 300 and into a first Wien filter 220. They then pass through an aperture 245 in a diaphragm 255 positioned between the first Wien filter 220 and an inversion lens 240 (FIGS. 10b and 10c; not shown in FIG. 10a for clarity). Following transmission through the inversion lens 240, ions enter a second Wien filter 230. An exit lens 310 is located between the second Wien filter 230 and an exit aperture 210 of the static field mass filter 120.

The angular divergence of the ion beam is +−30 mrad relative to the Z axis. The mass range is set to $M_0$+/−20%. The simulation (FIGS. 10b and 10c) shows that ions of the central mass $M_0$ pass along the Z axis without deviation.

The mass range transmitted by the static field mass filter 120 may be controlled in a number of ways. For example, as noted above, the magnetic flux density may be adjusted since this in turn adjusts the mass dispersion. However, the magnetic flux density is limited in practice. As another (or different) means for adjusting the mass dispersion of the static field mass filter 120, therefore, the dimensions of the aperture 245 in the diaphragm 255 may be mechanically adjusted to open and close it. Mass dispersion occurs in the X direction (the direction perpendicular to the magnetic flux density). Thus in a simplest arrangement, the aperture 245 in the diaphragm 255 may be opened or closed using cooperating first and second parts that are moveable in the X direction only. Alternatively, the diaphragm may be in the form of an iris, with a circular aperture 245 of variable diameter. The diaphragm 255 may additionally or alternatively be moveable in the Z direction so that, for given dimensions of the aperture 245, ion species of smaller or larger masses may be able to pass through the aperture 245.

Referring briefly back to FIG. 7, it may be noted that the value for the dispersion X calculated at the exit to the Wien filter can be approximately half the dispersion at the aperture 245, because of the separation between the exit of the first Wien filter and the diaphragm 255, and the divergent trajectory taken by the ions as they leave the first Wien filter towards the diaphragm 255. With this information, the aperture diameter may be set for a given Wien filter dimensions and ion energy, at a specific magnetic flux density, so as to select specific ions. For example, if a magnetic field flux density of 0.5T is applied to a first Wien filter of length 70 mm and ion energy 2 keV, setting the aperture to a diameter of 1.6 mm will transmit all ions in a mass window of +1-10% of a central mass $M_0$=100 amu: that is to say, in a mass window from 90 amu to 110 amu. Fine tuning may be achieved by adjustment of the magnetic flux density.

Because of the crossed uniform magnetic and electric fields, the Wien filter arrangement of FIGS. 10a, 10b and 10c has different symmetries in the X and Y directions. As a consequence, the ion optical characteristics are different in the X and Y directions respectively. In order to control the focus in both directions, an asymmetric lens design is desirable. This can be achieved by a multipole lens arrangement to which a static voltage is applied, such as a quadrupole lens, a set of crossed slit aperture lenses, or by an Einzel lens 240, for example. An Einzel lens 240 is shown in FIG. 10a, with outer electrodes 242, 246 between which is positioned a central electrode 244.

Figure 11:
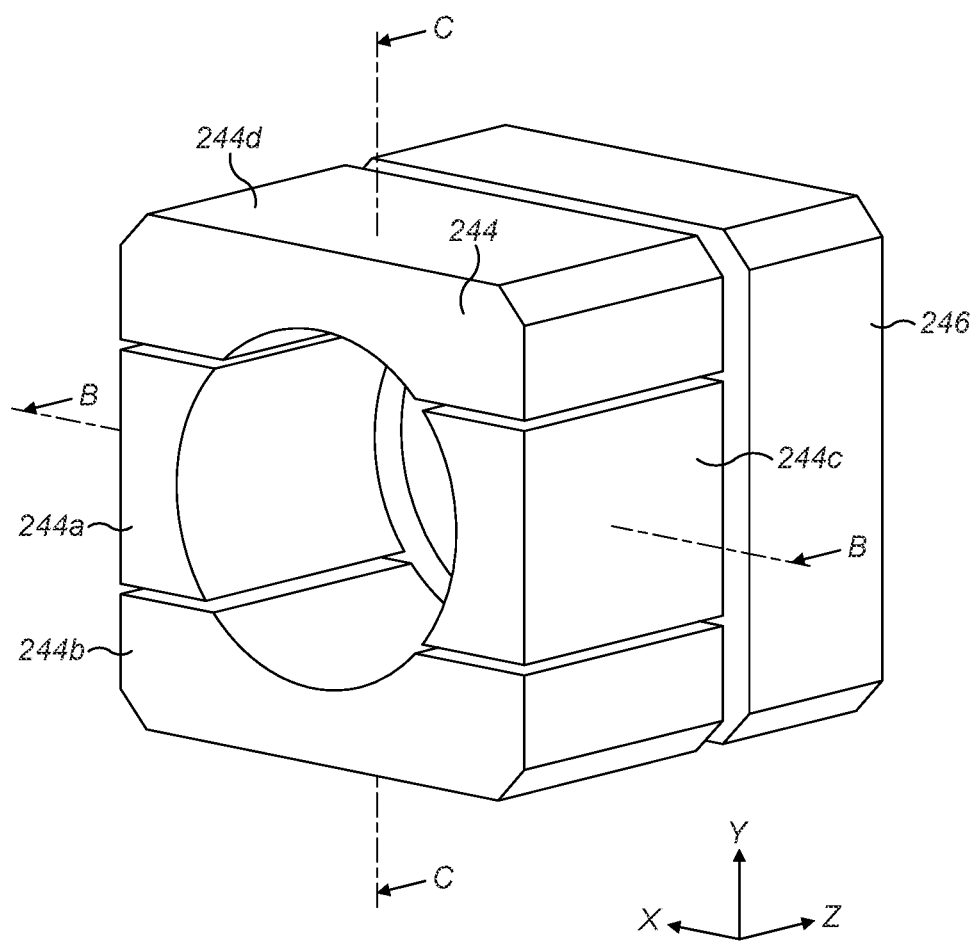
FIG. 11 shows a partial cutaway of a part of an Einzel lens forming a preferred embodiment of the inversion lens of FIGS. 8, 10a, 10b and 10c.

FIG. 11 shows a partial cutaway perspective view of the Einzel lens 240 of FIG. 10a, with the outer electrode 242 removed to reveal the structure of the central electrode 244. In the particularly preferred arrangement shown in FIG. 11, the centre electrode is cut into 4 segments 244a, 244b, 244c and 244d. Such quadrupole lenses can focus in a first direction whilst defocussing in a second direction orthogonal to it.

Figure 12A:
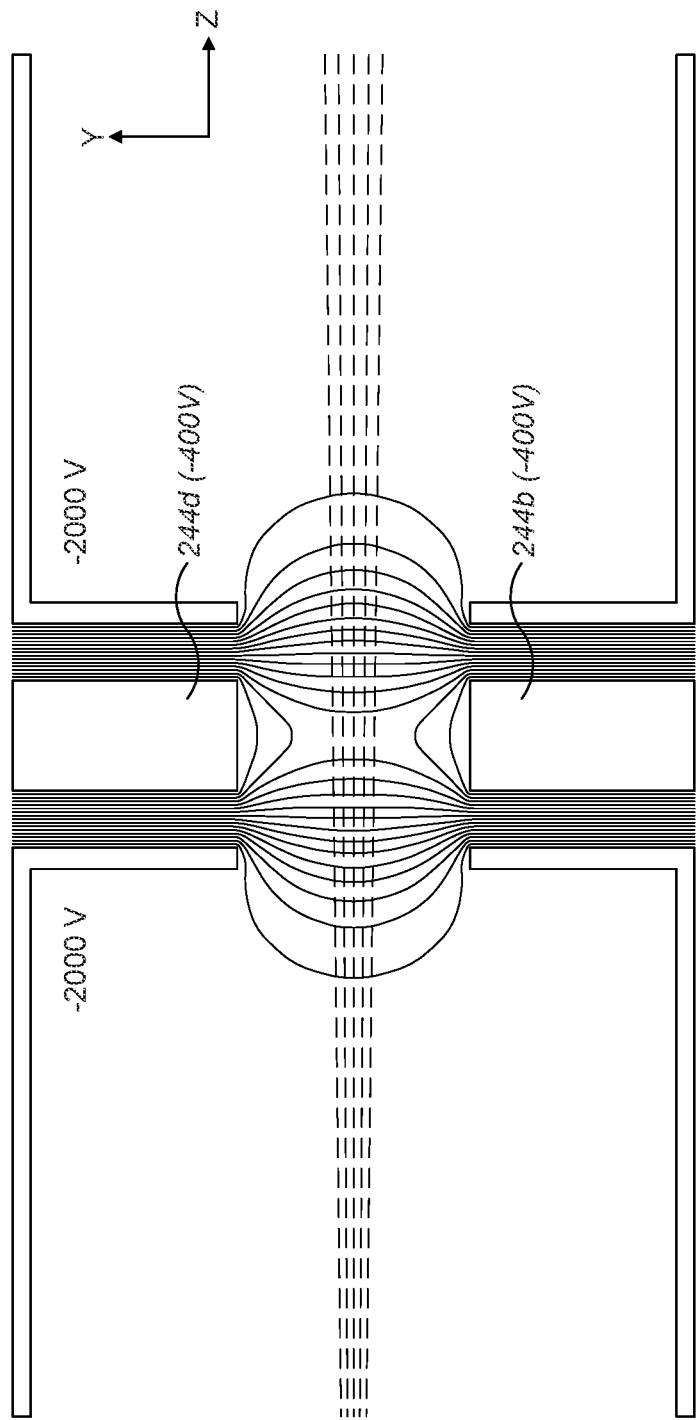
FIGS. 12a and 12b show orthogonal sections through the Einzel lens of FIG. 11, along with equipotential surfaces.

The Einzel lens arrangement of FIG. 11 with a split central electrode 244 is particularly preferred because it permits superimposition of a quadrupole component onto the Einzel lens, between the first and second Wien filters. The segmenting of the central electrode 244 allows different focal strengths to be generated in the X and Y directions respectively. FIG. 12a shows a section along the line C-C of the Einzel lens of FIG. 11, whilst FIG. 12b shows a section along the orthogonal line B-B of FIG. 11. The second and fourth electrodes 244b, 244d, lying in the upper and lower quadrants of the lens as seen in FIG. 11, are supplied with a negative DC voltage of, for example, −400V. The first and third electrodes 244a and 244c, lying in the left and right quadrants of the lens as seen in FIG. 11, are grounded (voltages are indicated relative to the ion creation potential). The outer electrodes are supplied with −2000V, and the ion energy is 2000 eV.

Figure 12C:
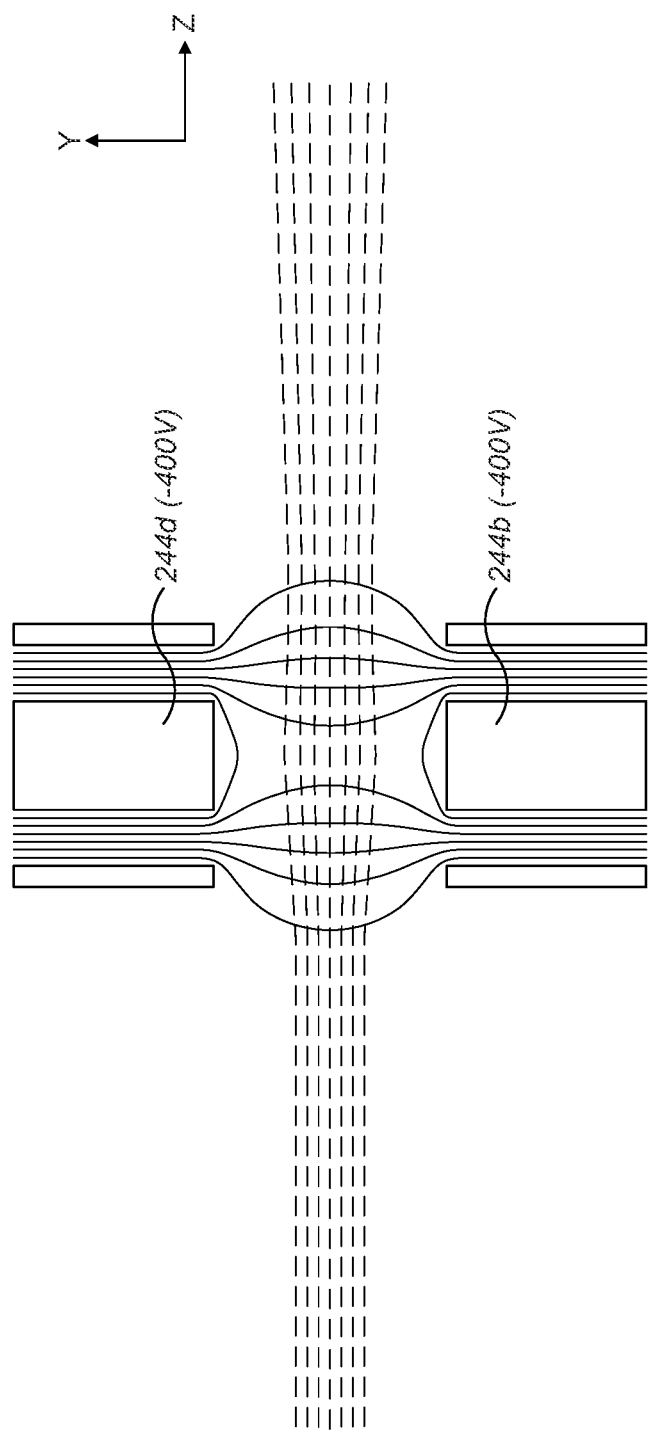
FIG. 12c shows a simplified version of FIG. 12a and FIG. 12d shows a simplified version of FIG. 12b.
Figure 12D:
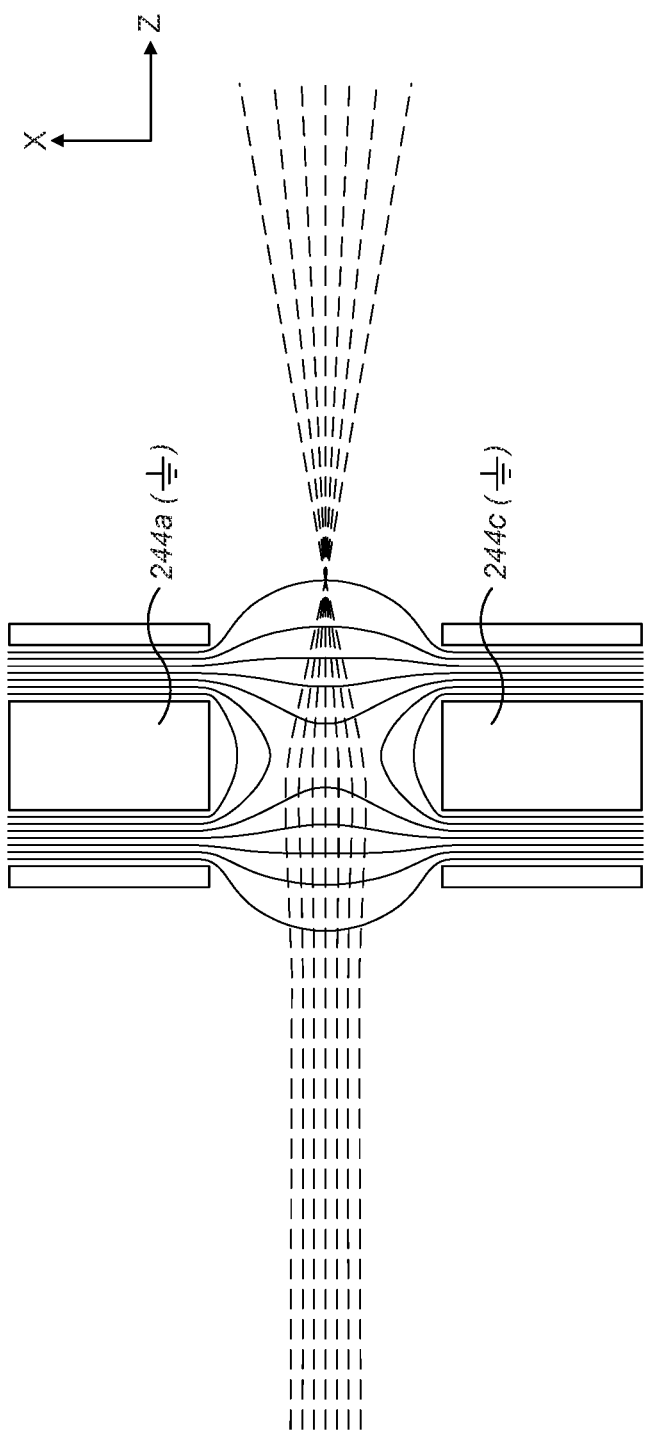

The equipotential surfaces are shown in FIGS. 12a and 12b and also the ion trajectories. FIGS. 12c and 12d show, respectively, simplified versions of FIGS. 12a and 12b, with fewer contours and equipotential surfaces. The different focusing strengths in the orthogonal X and Y directions can be discerned from FIGS. 12c and 12d in particular.

In FIGS. 10b and 10c, the ion beam is decelerated from 2 KeV at the exit aperture 210 of the static field mass filter 120, down to 250 eV to be focused into the entrance aperture of the collision cell 30 (FIG. 5). The focal point on the right hand side of FIGS. 10b and 10c shows that all of the ions are focused into the entrance aperture of the collision cell 30, and no mass discrimination takes place.

Figure 13A:
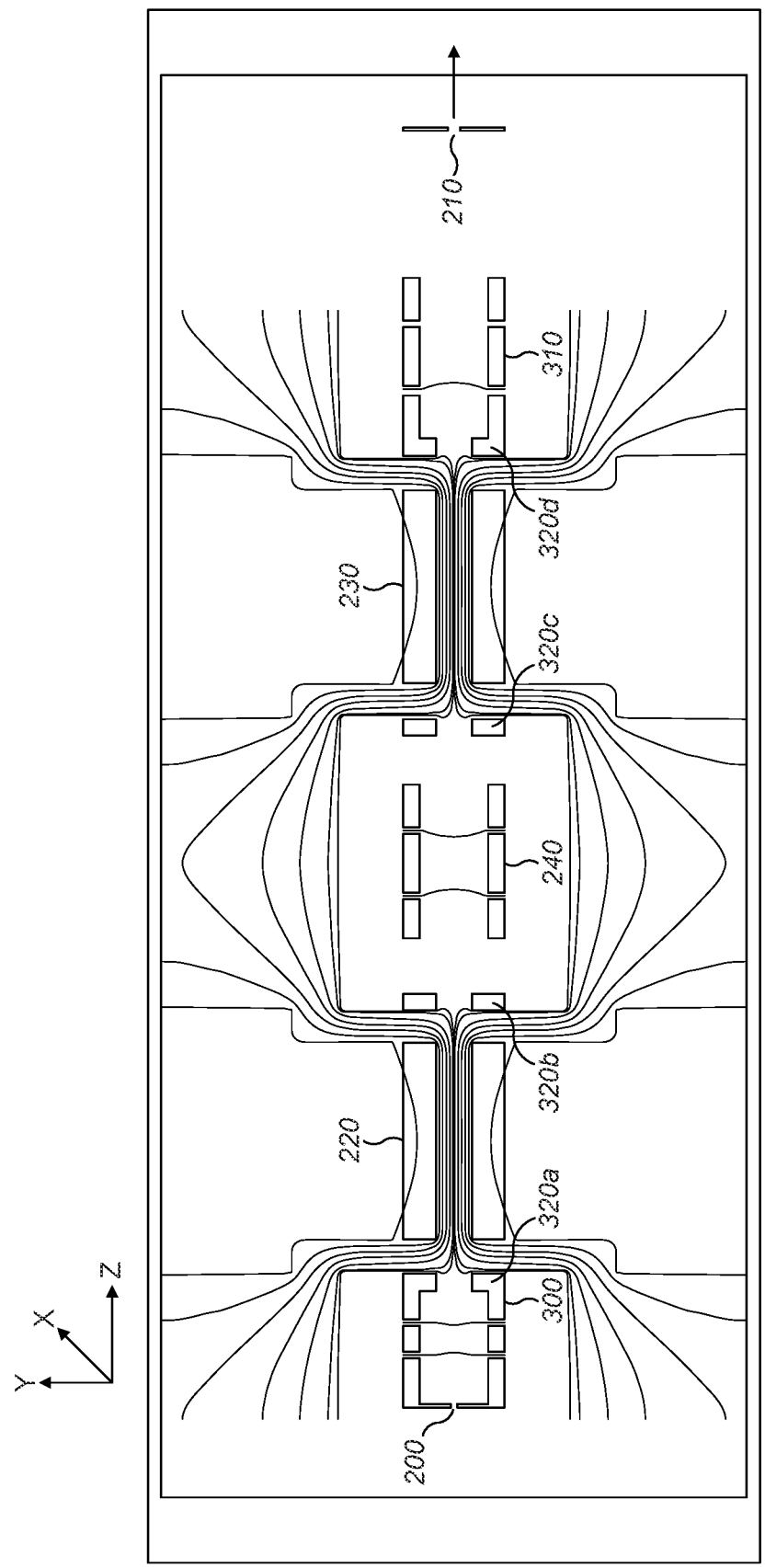
FIG. 13a shows a simulation, in the X-Z plane, of the magnetic potential lines generated by the first and second Wien filters of FIG. 8.
Figure 13B:
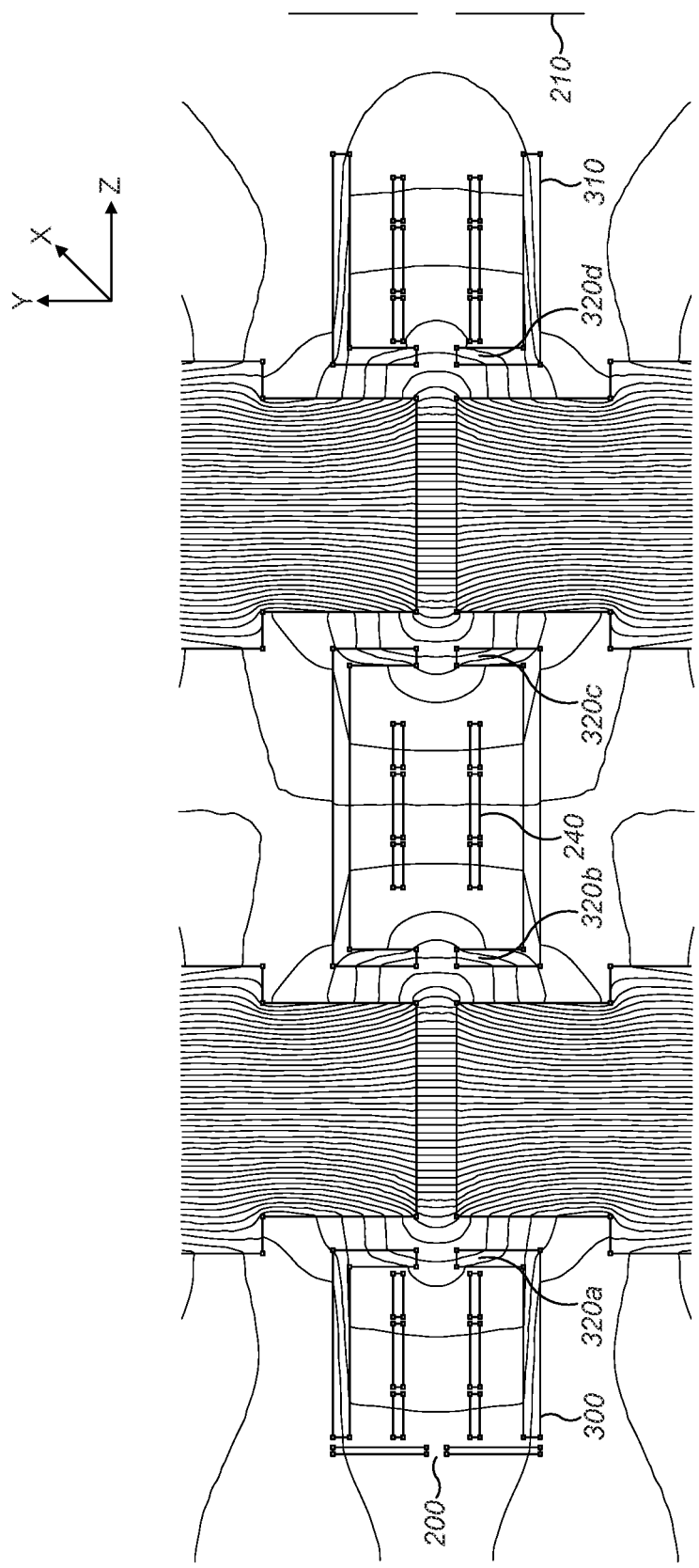
FIG. 13b shows the magnetic field lines thereof.

FIG. 13a shows a simulation of the magnetic equipotential surfaces in the static field mass filter of FIGS. 10a, 10b and 10c, in the X-Z plane of FIG. 8, and FIG. 13b shows a simulation of the more usual magnetic flux density lines in that same static field mass filter. The arrangement of components in FIGS. 13a and 13b is the same as shown in FIGS. 10a and 10b, that is, ions travel through the static field mass filter 120 from left to right in FIGS. 13a and 13b. In addition to the components shown in FIGS. 10a, 10b and 10c, FIGS. 13a and 13b also show a first pair of magnetic shields 320a, 320b positioned at the entrance and exit of the first Wien filter 220, and a second pair of magnetic shields 320c and 320d positioned at the entrance and exit of the second Wien filter 230. The magnetic shields 320a, 320b, 320c and 320d are preferably iron shims, made of soft iron. These help to control the magnetic fringe fields in the static field mass filter 120, which is desirable in order to achieve the desired ion optical performance of the IRMS 100. As noted in connection with FIGS. 10a, 10b and 10c, the inversion lens 240 may comprise or include an Einzel lens. The entrance lens 300 and the exit lens 310 may also consist of or comprise Einzel lenses. These Einzel lenses may have multipole components in order to allow for the different focusing conditions in the X and Y direction of the system (as described above in connection with FIGS. 11, 12a and 12b).

The magnetic coils of the first and second Wien filters may be of similar construction and geometry. The coil current supplied to each may be the same, with the two coils of the double Wien filter arrangement of FIGS. 10a, 10b and 10c and 13a/13b coupled in series. Then, only a single magnetic field controller is needed. The two Wien filters may alternatively be connected to a single magnetic yoke powered by a single coil, as is shown schematically in the arrangement of FIG. 5.

Any small differences resulting from constructional tolerances can then be compensated by the electric fields. Although the electric fields may differ slightly, the symmetry of such an arrangement enhances the robustness of the ion optical setup, because instabilities in the magnetic field of the first Wien filter are then compensated in the magnetic field of the second Wien filter 230.

Figure 14:
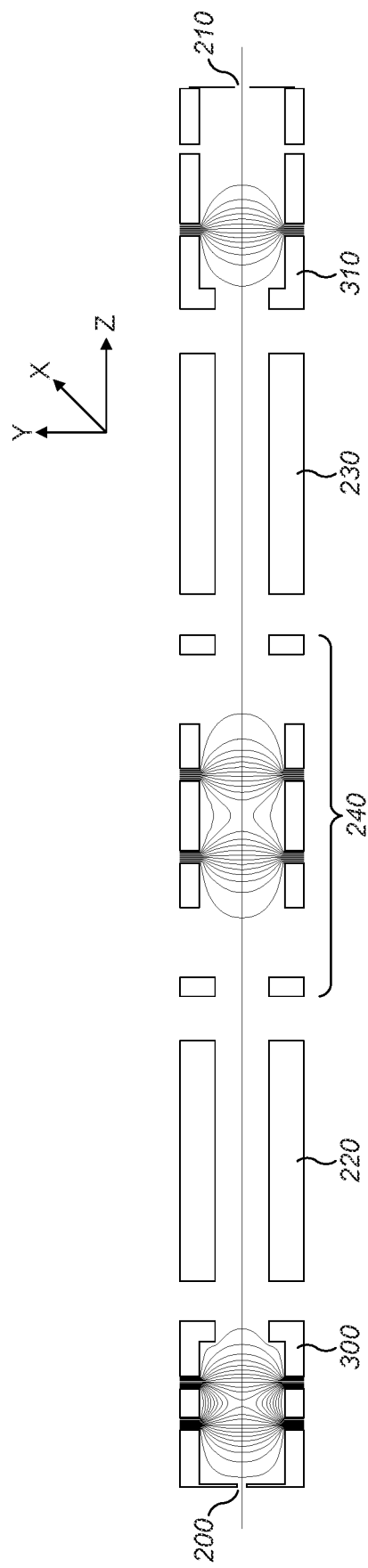
FIG. 14 shows a simulation, in the Y-Z plane, of the electric potential lines generated by the lenses of FIG. 8.

FIG. 14 shows the electric potentials in the static field mass filter of FIGS. 10a, 10b, 10c, 12a and 12b. Again, instabilities in the electric field in the first Wien filter 220 are compensated in the electric field of the second Wien filter 230.

The electric field parallel to the surface of the magnet pole piece of the first and second Wien filters 220, 230 also needs to be reasonable homogeneous. This is challenging since the width of the gap between the pole pieces is in the range of about 10 mm while the length of the surface of the pole pieces is about 100 mm. The challenge is to control the electric field in this small gap and to create a homogeneous electric field inside this gap; the usual technique of ensuring that the plates are much larger than the separation is not possible because of the specific geometric challenges in the present arrangement.

Figure 15A:
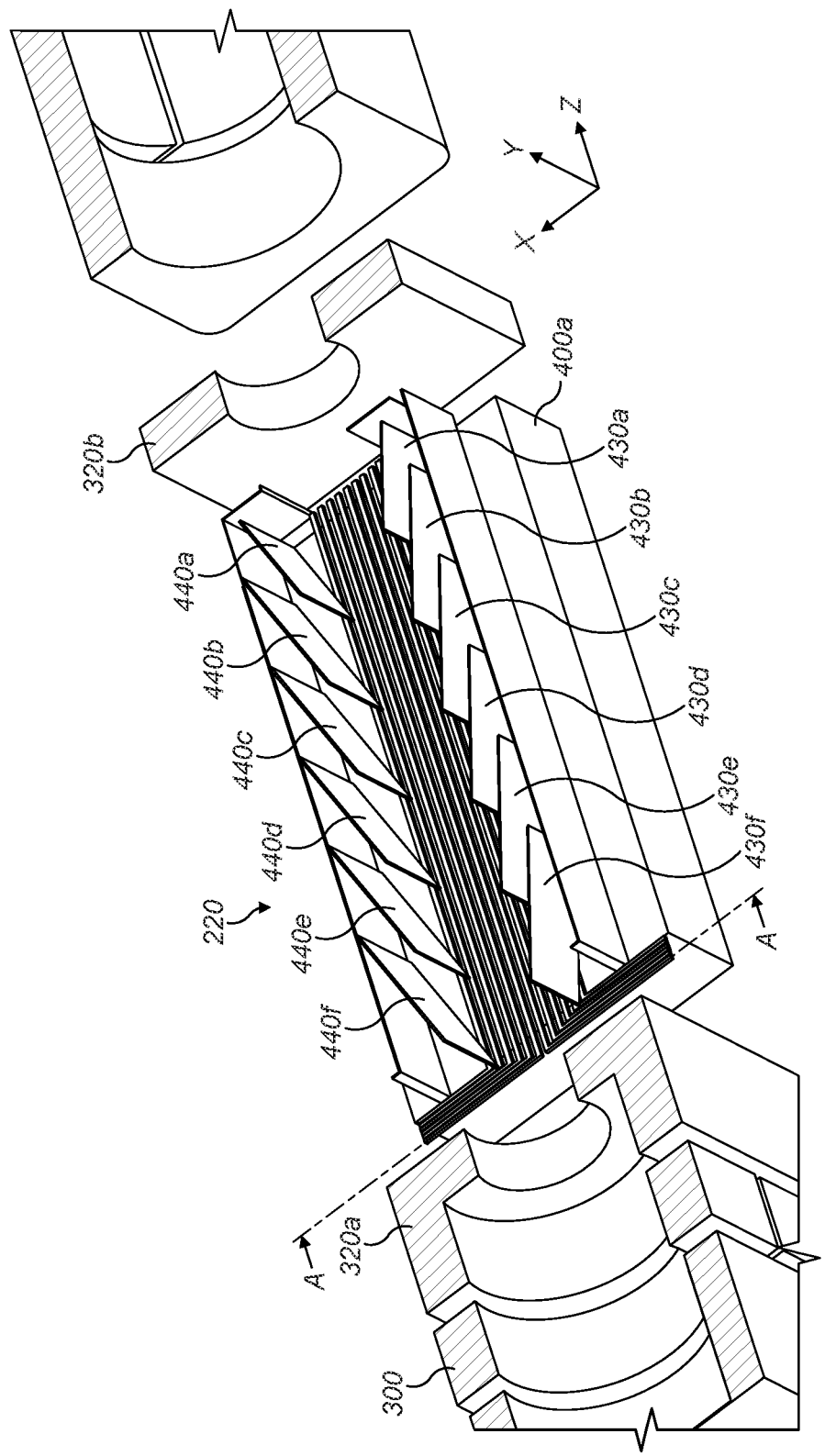
FIG. 15a shows a perspective close up side view of the first Wien filter of FIG. 10a, sliced in the X-Z plane, illustrating a preferred arrangement of the electrodes for generating an electric field within the first Wien filter.
Figure 15B:
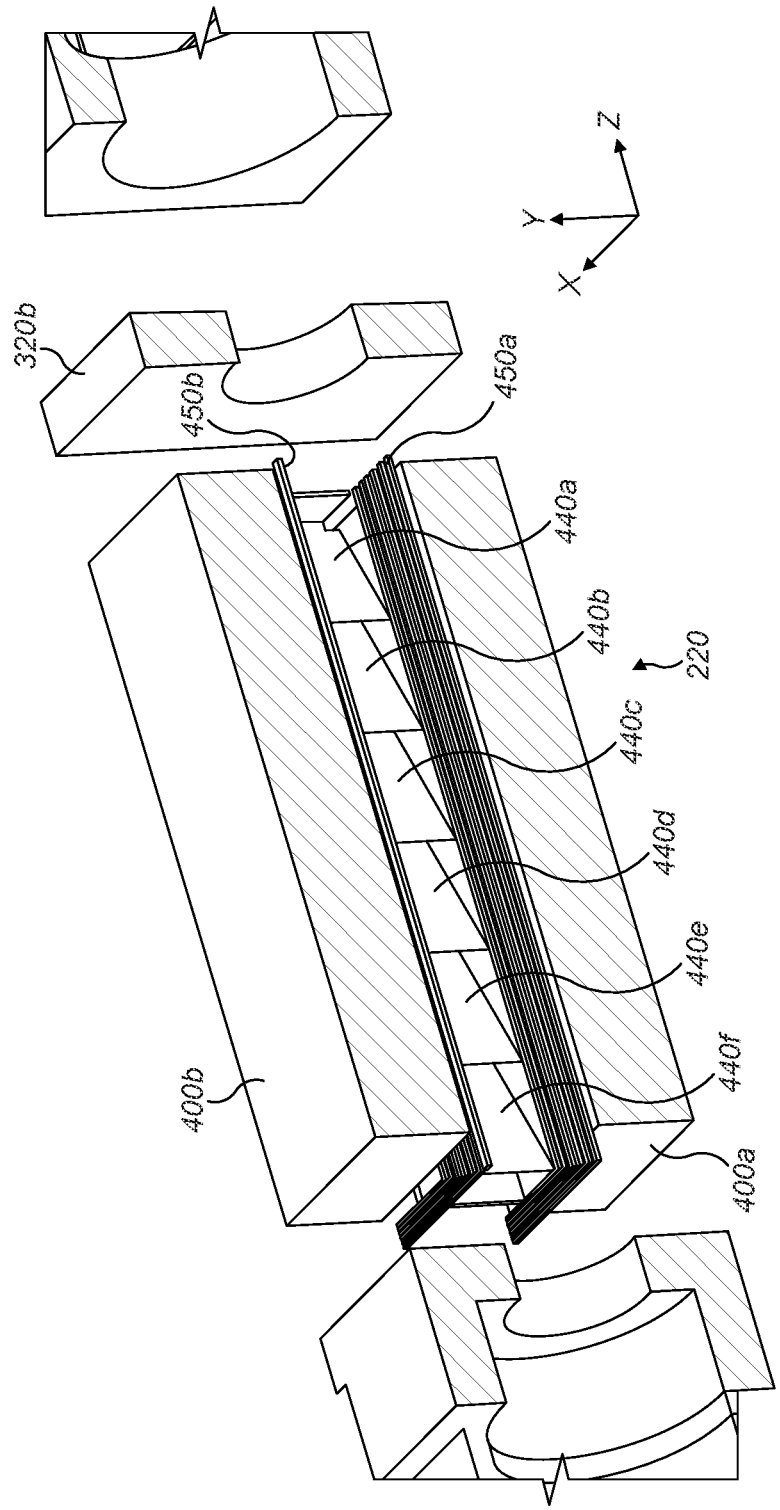
FIG. 15b shows a perspective close up side view of the first Wien filter of FIG. 10a, sliced in the Y-Z plane illustrating a preferred arrangement of the electrodes for generating an electric field within the first Wien filter.
Figure 15C:
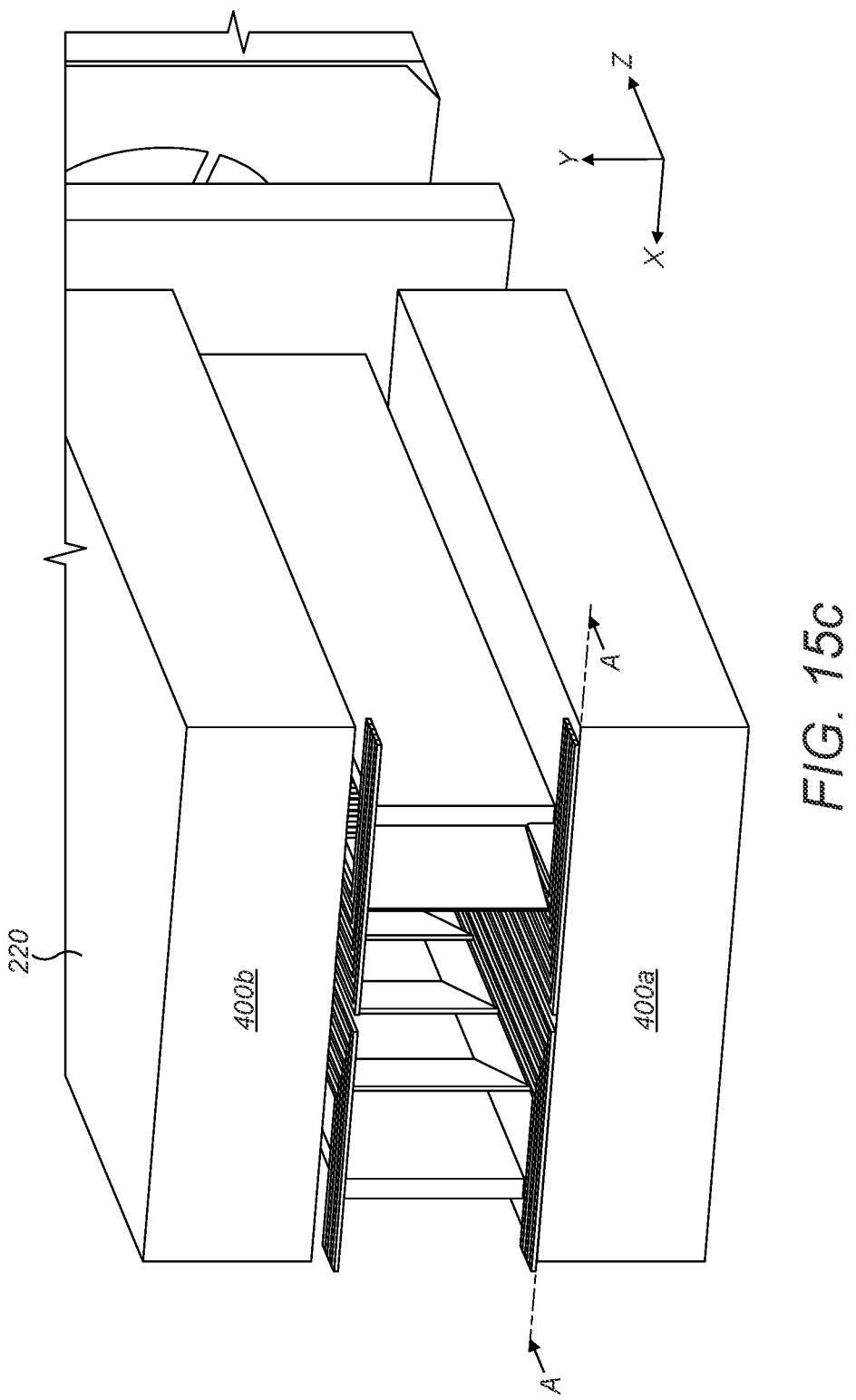
FIG. 15c shows a perspective close up end view of the first Wien filter of FIG. 10a, illustrating a preferred arrangement of the electrodes for generating an electric field within the first Wien filter.
Figure 15D:
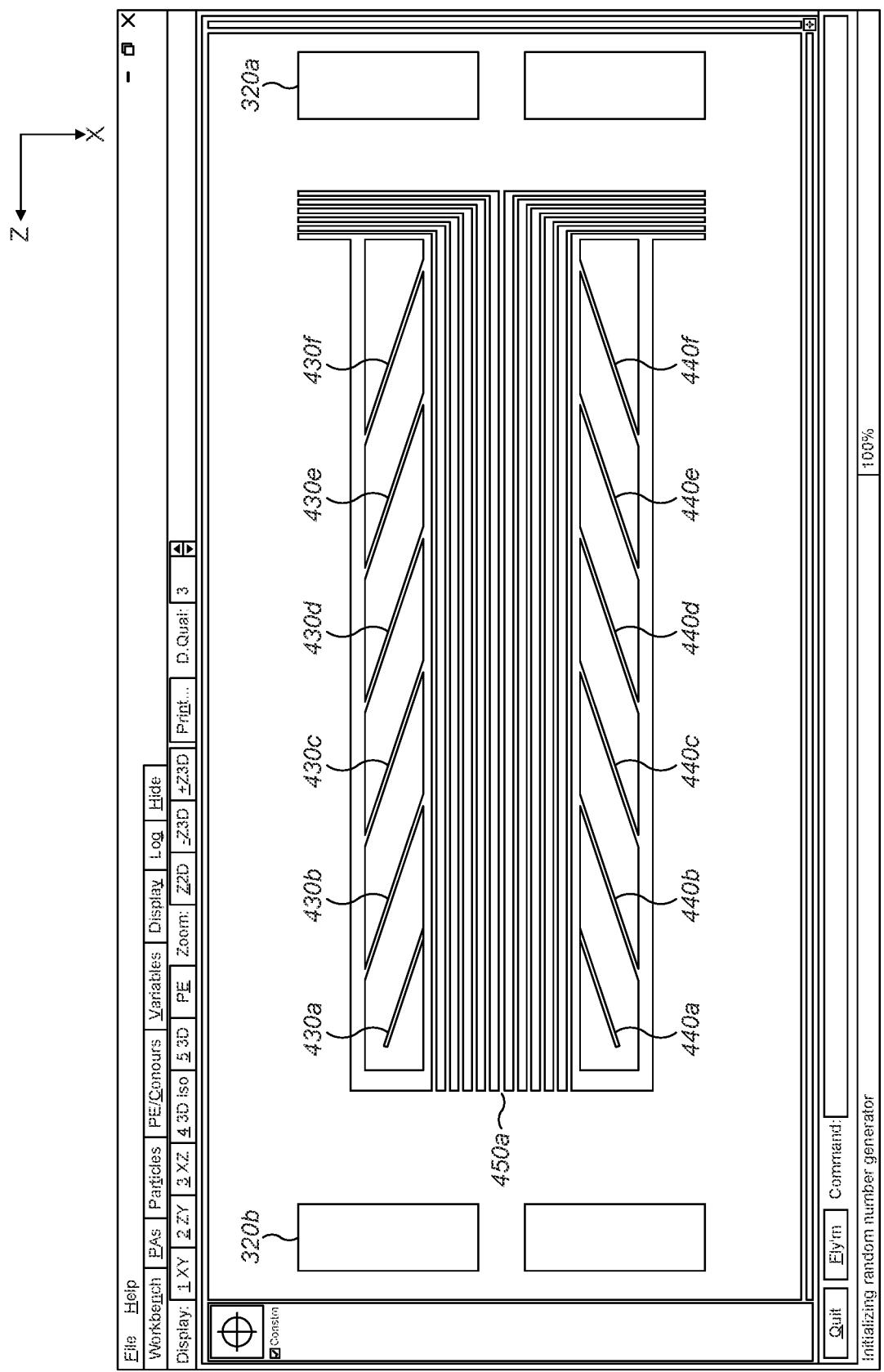
FIG. 15d shows a view of the first Wien filter of FIG. 10a, along the line A-A of FIGS. 15a and 15b, to illustrate the configuration of the electrodes of FIGS. 15a-15c in further detail.

FIG. 15a shows a perspective slice through the first Wien filter 220 of FIG. 10a, in the X-Z plane. FIG. 15b shows a perspective slice through the first Wien filter 220 of FIG. 10a, in the orthogonal Y-Z plane. FIG. 15c shows an end perspective view of the entrance to the first Wien filter 220 of FIG. 10a, and FIG. 15d shows a view in the X-Z plane along the line A-A of FIGS. 15a, 15b and 15c.

As seen in FIGS. 15a, 15b and 15c, the first Wien filter 220 comprises first and second magnetic pole pieces 400a, 400b which are separated in the Y direction. The magnetic shields 320a, 320b are mounted adjacent to the first pole piece 400a and the second pole piece 400b (FIG. 15b in particular). Suitably, the shields comprise disks with a central hole close to the magnetic pole piece and an adjacent tube extending in the Z direction. The shields are open at the entrance and exit of the system. Between the two fields, the shields are connected to a closed cylinder having first and second holes.

Mounted upon the magnetic first pole piece 400a is a first plurality of thin electrically conducting lines 450a. A second plurality of thin electrically conducting lines 450b is formed upon the opposed second pole piece 400b. Each thin electrically conducting line in the first and the second plurality of thin electrically conducting lines 450a, 450b is electrically isolated from its adjacent conducting line(s), so that a different electrostatic potential may be applied to each conducting line, as will be further described in connection with FIG. 16 below. One suitable way of achieving this is by printing conductive lines onto an insulating substrate (not shown in FIG. 15a, 15b or 15c) so as to form a printed sheet, as best seen in FIG. 15d.

A first printed sheet may then be bonded onto the first magnetic pole piece 400a whilst a second printed sheet may be bonded onto the second magnetic pole piece 400b. As may be seen in the Figures, the plurality of thin electrically conducting lines 450a and 450b are printed symmetrically along the Z axis about X=0, and extend outwardly (in the +/−X directions) across only a part of the full width of the first and second pole pieces 400a, 400b.

Between the magnetic shields 320a, 320b formed along the outer edges of the first magnetic pole piece 400a, and the outermost thin electrically conducting lines printed on the insulating substrates is are positioned a plurality of angled baffles. As may be seen best in FIGS. 15a and 15d, the angled baffles are positioned on both sides of the first plurality of thin electrically conducting lines 450a (and also, with reference to FIG. 15b, on both sides of the second plurality of thin electrically conducting lines 450b). In the illustrated embodiment, there are 6 angled baffles 430a-430f separated in the Z direction towards the edge of the first and second pole pieces 440a, 440b in the +X direction, and 6 corresponding angled baffles 440a-440f that are separated in the Z direction towards the edge of the first and second pole pieces 440a, 440b in the −X direction. The angled baffles 430a-430f and 440a-440f are arranged symmetrically both in the X and Z directions so that they form a herringbone shape. Such a shape helps to catch those lighter ions having a greater angle of deflection in the first Wien filter, which are to be filtered out. The herringbone arrangement thus avoids reflections of the ion beam along the side walls of the arrangement, as the ion beam traverses the magnet gap in the first Wien filter.

Figure 16:
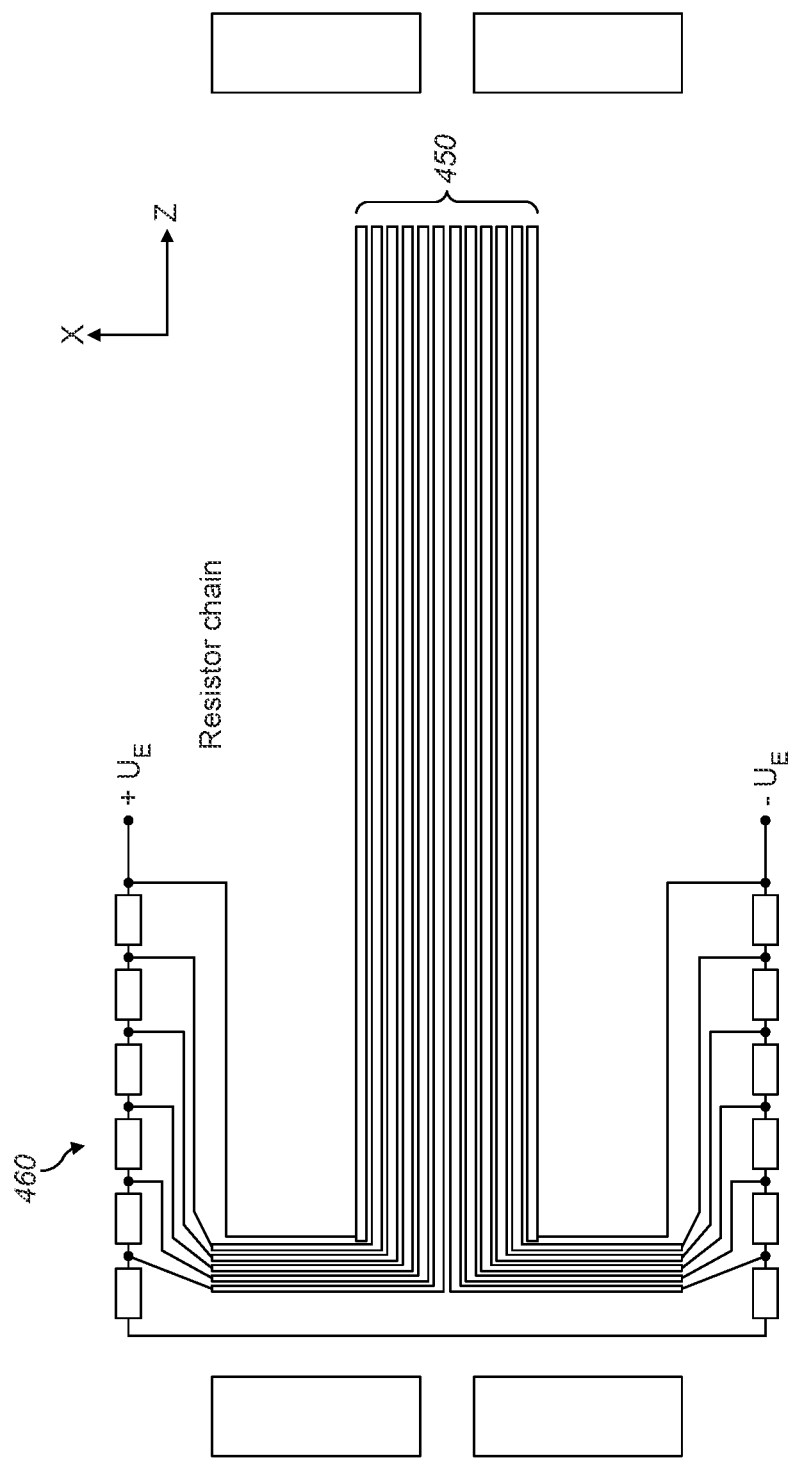
FIG. 16 shows a plan view of the electrodes of FIGS. 15a-15d, along with a potential divider.

FIG. 16 shows a plan view of the printed sheet upon which the first plurality of thin electrically conducting lines 450a is printed, prior to bonding to the first pole piece 400a and the addition of the angled baffles 430a-f; 440a-f and the magnetic shields 320a, 320b. As may be seen in FIG. 16, each electrically conducting line of the plurality 450a is connected to a voltage divider 460 such that there is a linear drop in electrical potential, in the X direction transverse to the longitudinal direction of the first Wien filter 220.

Figure 17:
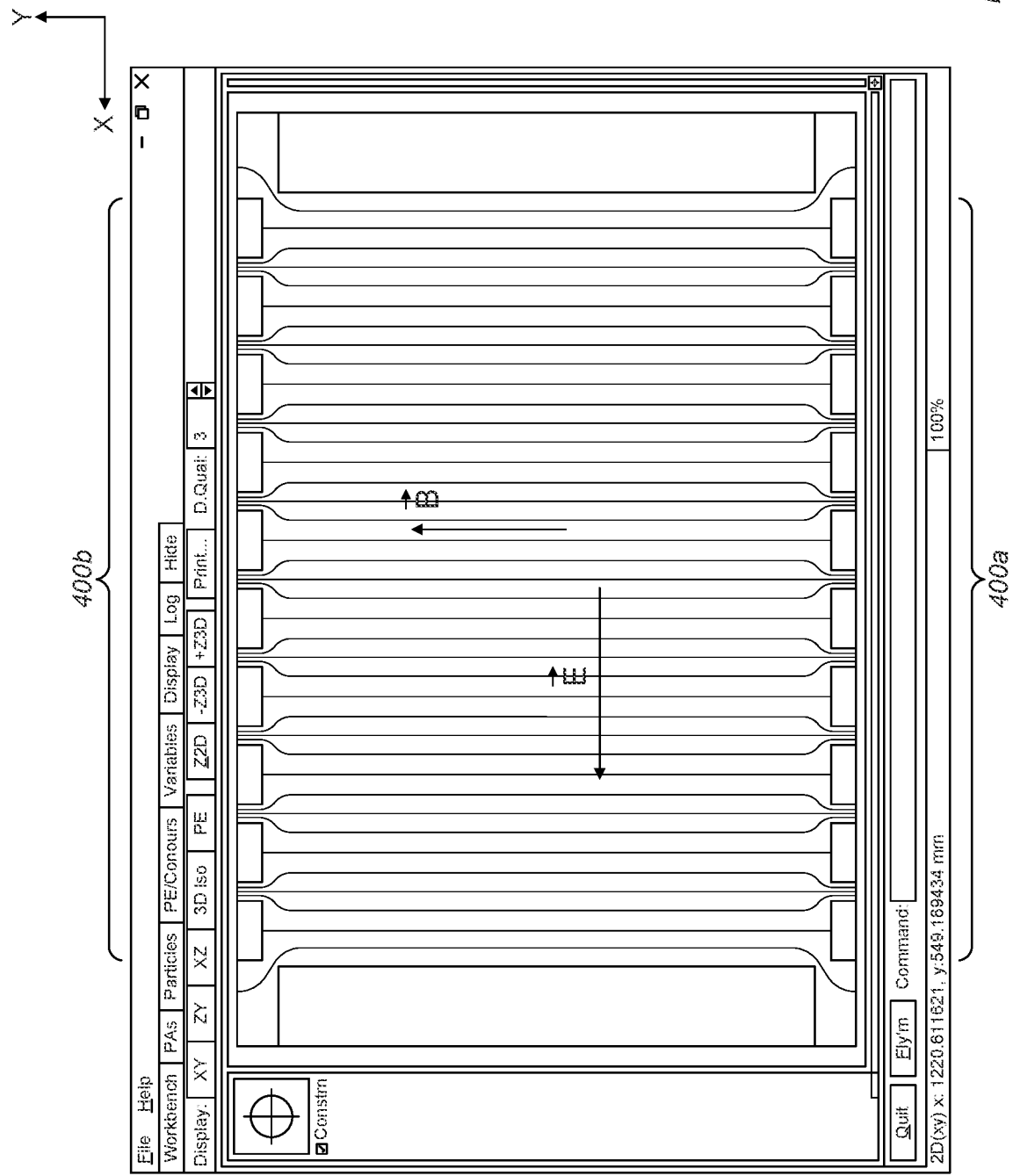
FIG. 17 shows a section through the first Wien filter of FIGS. 10a and 15a-15d, in the X-Y plane, along with equipotential lines.

Although not illustrated in the Figures, it will be understood that the printed sheet upon which is formed the second plurality of thin electrically conducting lines 450b for bonding with the second pole piece 400b of the first Wien filter 220, is also provided with an array of resistors forming a voltage divider. The voltage divider of each of the printed sheets (bonded to the first and second pole pieces 400a, 400b respectively) is preferably configured identically so that there is a linear drop in electric potential in the transverse (X) direction of the first Wien filter 220, whilst the electrostatic potential along the magnet gap of the first Wien filter (in the Z direction), and the electrostatic potential in the Y direction between the first and second pole pieces 400a, 400b, is constant. A simulation of the electric field generated by the arrangement of FIGS. 15a-15d and 16 is shown in FIG. 17. In particular, FIG. 17 shows a section in the X-Y plane through the first Wien filter 220, at a location along the Z axis which is towards the centre (in the longitudinal Z direction) of the first Wien filter 220 so that any fringe effects are negligible. The first plurality of thin electrically conducting lines 450a (bonded in use to the first magnetic pole piece 400a which is not shown in FIG. 17 for clarity) and the second plurality of thin electrically conducting lines 450b (bonded in use to the second magnetic pole piece 400b which is also not shown in FIG. 17 for clarity) are each shown in FIG. 17 and separated in the Y direction. Equipotential lines are shown in FIG. 17, illustrating the good homogeneity of the electric field in a direction orthogonal to the magnetic field.

Figure 18A:
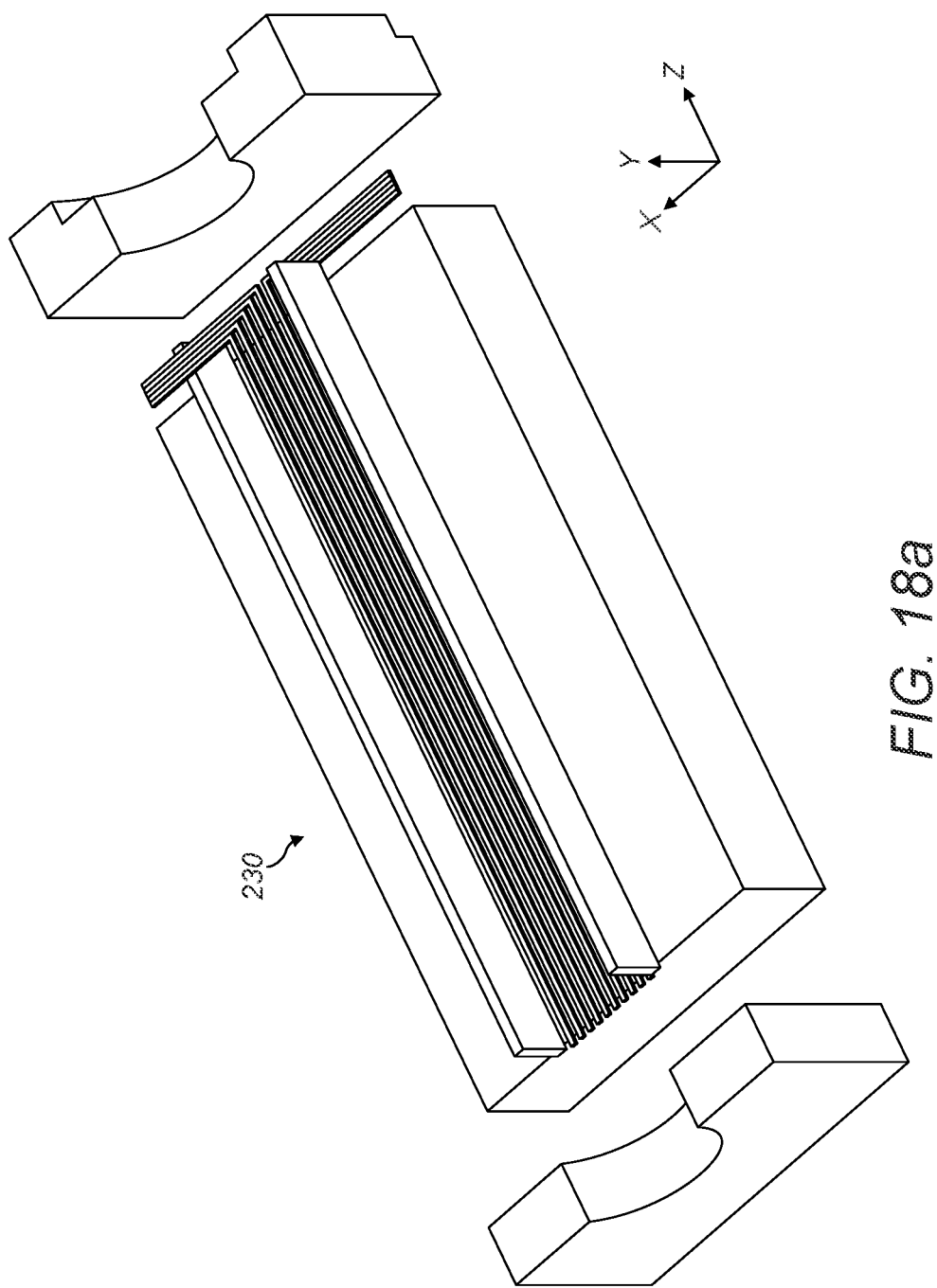
FIG. 18a shows a perspective close up side view of the second Wien filter of FIG. 10a, sliced in the X-Z plane, illustrating a preferred arrangement of the electrodes for generating an electric field within the second Wien filter.

FIG. 18a shows a perspective slice in the X-Z plane through the second Wien filter 230 in the arrangement of FIG. 10a in particular. The slice through the second Wien filter 230 of FIG. 18a is the same as the slice shown in FIG.

Figure 18B:
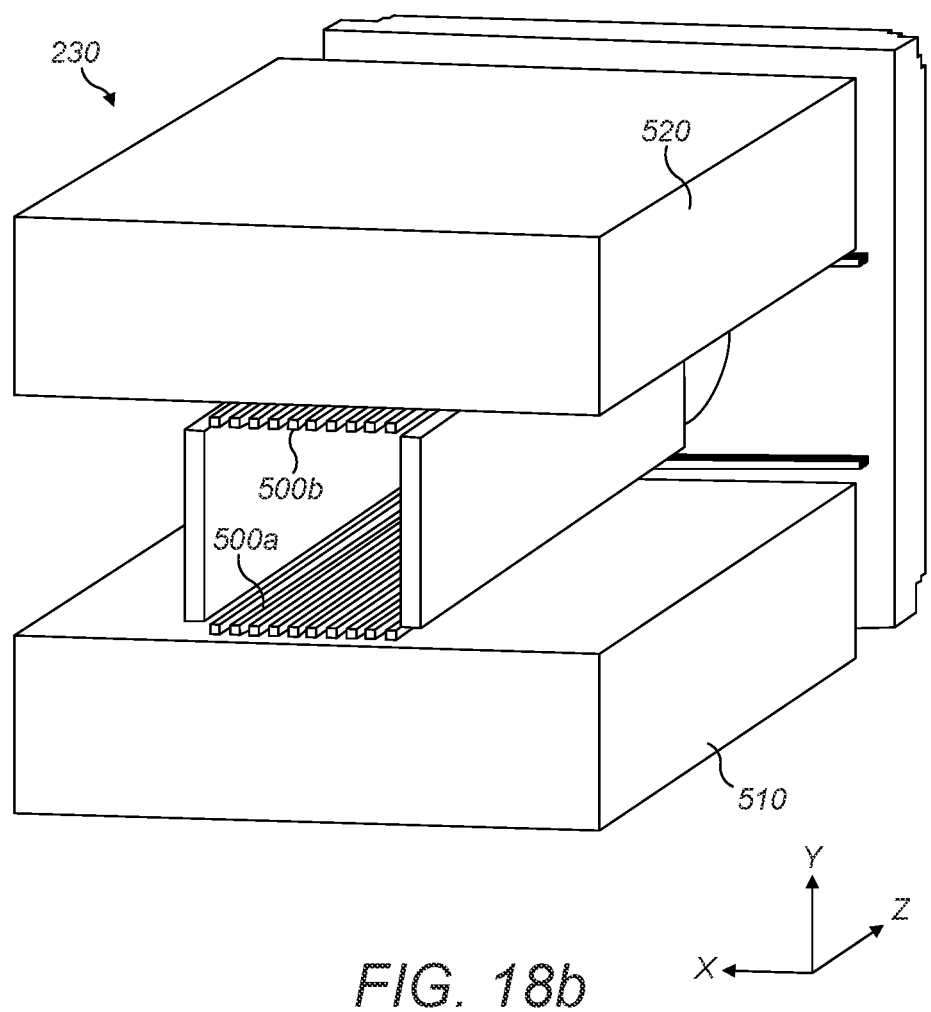
FIG. 18b shows a perspective close up end view of the second Wien filter of FIG. 10a, illustrating a preferred arrangement of the electrodes for generating an electric field within the second Wien filter.

15a in respect of the first Wien filter 220. FIG. 18b shows an end perspective view of the second Wien filter 230.

In each of FIGS. 18a and 18b, it may be seen that a first plurality of thin electrically conducting lines 500a are positioned on a first magnetic pole piece 510 of the second Wien filter 230, whereas a second plurality of thin electrically conducting lines 500b are positioned on a second magnetic pole piece 520 of the second Wien filter 230. The construction and configuration of each of the two sets of thin electrically conducting lines 500a, 500b may be the same as that described in connection with FIGS. 15a-15d and 16 above, with lines printed onto an insulating substrate that is then bonded to the first and second pole pieces 510, 520. Each printed substrate may also be provided with a potential divider such as is shown in FIG. 16.

By contrast with the arrangement in the first Wien filter 220, however, the second Wien filter does not contain any angled baffles. The flat electrodes (FIG. 18) are accordingly positioned immediately adjacent the outermost lines of the plurality of electrically conducting lines 500a, 500b. The purpose of the baffles, desirably present in the first Wien filter 220, is to minimize charging effects at the electrodes by intense ion beams. In ICP, for example, there is a very intense argon beam. The effects of such a beam are already filtered out by the time the ions arrive at the second Wien filter 230, so that relatively very few ions strike the electrodes in that, and accordingly, baffles are not considered to be necessary in the second Wien filter 230.

Although some specific embodiments have been described, it will be understood that these are merely for the purposes of illustration. Various modifications are possible. For example, although preferred embodiments have been described in the context of IRMS, it is to be understood that the invention is in no way thus limited, and that other types of mass spectrometer could also benefit from the static field mass filter described herein. Moreover, it is to be understood that the collision cell described above, that induces a mass shift reaction, is merely for the purposes of illustration. More generally, the ions that are filtered by the static field mass filter may be provided to any type of reaction cell, which might induce any type of change to the filtered ions prior to analysis. Indeed, in other embodiment contemplated and considered to be within the scope of the present disclosure, the ions exiting the static field mass filter could be directed instead directly to an analysing unit such as a mass analyser.

What is claimed is:

1. A mass spectrometer comprising:
    a static field mass filter having:
        an entrance aperture configured to receive an ion beam from an ion source,
        an exit aperture configured to eject ions, the static field mass filter defining a longitudinal symmetry axis between the entrance and exit apertures,
        a first Wien filter configured to deflect ions away from the longitudinal symmetry axis in accordance with their m/z,
        a second Wien filter configured to deflect the ions back towards the longitudinal symmetry axis in accordance with their m/z, and
        an inverting lens positioned along the longitudinal symmetry axis between the first and second Wien filters, to invert the direction of deflection of the ions from the first Wien filter;
    an ion source arranged upstream of the static field mass filter and configured to direct ions into the entrance aperture thereof; and
    a mass analyser arranged downstream of the static field mass filter, configured to mass analyse either (a) ions ejected from the exit aperture thereof, or (b) product ions derived from the ions ejected from the exit aperture of the static field mass filter.

2. The mass spectrometer of claim 1, comprising a reaction cell located downstream of the exit aperture of the static field mass filter, and wherein the mass analyser is downstream of the reaction cell, the reaction cell being configured to cause the ions received from the static field mass filter to undergo a change in their properties, and to eject the reacted ions to the mass analyser.

3. The mass spectrometer according to claim 1 for analyzing isotope ratios of atoms or molecules contained in a sample wherein
    the ion source is configured to generate a beam of ions from the sample;
    the mass analyser is a sector field mass analyser configured to spatially separate the analysed ions in accordance with their m/z; and further wherein the mass spectrometer comprises an ion multicollector having either (i) a plurality of ion detectors each arranged downstream of the sector field mass analyser or (ii) a single ion detector arranged downstream of the sector field mass analyser, for detecting a plurality of different ion species each separated by the sector field mass analyser.

4. The mass spectrometer of claim 1, wherein the static field mass filter further comprises a diaphragm located between the first and the second Wien filters, the diaphragm having an aperture configured to allow passage of at least some of the ion species exiting the first Wien filter.

5. The mass spectrometer of claim 4, wherein the aperture of the diaphragm is of a dimension such that ions having an m/z higher than a threshold m/z are deflected by the first Wien filter a relatively smaller distance in a direction orthogonal to the longitudinal symmetry axis so that they are able to pass through the aperture, and ions having an m/z lower than a threshold m/z are deflected by the first Wien filter a relatively greater distance in a direction orthogonal to the longitudinal symmetry axis so that they are unable to pass through the aperture.

6. The mass spectrometer of claim 4, wherein the aperture of the diaphragm is of a dimension such that ions having an m/z lower than a threshold m/z are deflected by the first Wien filter a relatively smaller distance in a direction orthogonal to the longitudinal symmetry axis so that they are able to pass through the aperture, and ions having an m/z higher than a threshold m/z are deflected by the first Wien filter a relatively greater distance in a direction orthogonal to the longitudinal symmetry axis so that they are unable to pass through the aperture.

7. The mass spectrometer of claim 4, wherein the aperture of the diaphragm is of a dimension such that ions having an m/z in a m/z window are deflected by the first Wien filter a relatively smaller distance in a direction orthogonal to the longitudinal symmetry axis so that they are able to pass through the aperture, and ions having an m/z outside m/z window are deflected by the first Wien filter a relatively greater distance in a direction orthogonal to the longitudinal symmetry axis so that they are unable to pass through the aperture.

8. The mass spectrometer of claim 1, wherein the inverting lens is asymmetric.

9. The mass spectrometer of claim 8, wherein the inverting lens is a multipole lens.

10. The mass spectrometer of claim 9, wherein the multipole lens comprises a plurality of crossed slit aperture lenses.

11. The mass spectrometer of claim 8, wherein the multipole lens is an Einzel lens having first and second circumferentially opposed lens segments to which a first voltage is applied in use, and having third and fourth circumferentially opposed lens segments interposed between the first and second circumferentially opposed lens segments, the third and fourth circumferentially opposed lens segments having a second voltage, different from the first voltage, applied to them in use.

12. The mass spectrometer of claim 1, further comprising a first magnetic shield between the first Wien filter and the inverting lens, and a second magnetic shield between the inverting lens and the second Wien filter, to reduce or remove the effect of stray magnetic fields of the first and second Wien filters, upon the inverting lens.

13. The mass spectrometer of claim 1, further comprising an entrance lens positioned between the entrance aperture of the static field mass filter and the first Wien filter.

14. The mass spectrometer of claim 13, wherein the entrance lens is formed as an Einzel lens.

15. The mass spectrometer of claim 12, further comprising a third magnetic shield between the entrance lens and the first Wien filter, to reduce or remove the effect of stray magnetic fields of the first and/or second Wien filters, upon the entrance lens.

16. The mass spectrometer of claim 1, further comprising an exit lens positioned between the second Wien filter and the exit aperture of the static field mass filter.

17. The mass spectrometer of claim 16, wherein the exit lens is formed as an Einzel lens.

18. The mass spectrometer of claim 15, further comprising a fourth magnetic shield between the second Wien filter and the exit lens, to reduce or remove the effect of stray magnetic fields of the first and/or second Wien filters, upon the exit electrode.

19. The mass spectrometer of claim 14, wherein the Einzel lens has a central electrode which is divided into a plurality of segments.

20. The mass spectrometer of claim 1, further comprising an electrostatic controller.

21. The mass spectrometer of claim 20, wherein the electrostatic controller is connected to both the first and the second Wien filters so as to control the electric field and/or magnetic flux density of each.

22. The mass spectrometer of claim 1, wherein the first Wien filter comprises a central channel through which ions in the ion beam can pass wherein the central channel is bounded by at least one baffle for catching ions deflected away from the said longitudinal symmetry axis.

23. The mass spectrometer of claim 22, wherein the central channel is bounded on first and second sides by a plurality of baffles.

24. The mass spectrometer of claim 23, wherein the plurality of baffles are positioned at an acute angle to the longitudinal symmetry axis in a herringbone pattern.

25. The mass spectrometer of claim 1, wherein the first Wien filter includes a plurality of electrical conductors extending in a direction parallel with the longitudinal symmetry axis, for generating an electric field within a central channel of the first Wien filter through which ions in the ion beam can pass.

26. The mass spectrometer of claim 25, wherein the first Wien filter includes a first electrode having a first group of the plurality of electrical conductors, and a second electrode having a second group of the plurality of electrical conductors, the first and second electrodes being spatially separated in a direction perpendicular to the said longitudinal symmetry axis so as at least partially to define between them the said central channel.

27. The mass spectrometer of claim 1, wherein the second Wien filter includes a plurality of electrical conductors extending in a direction parallel with the longitudinal symmetry axis, for generating an electric field within a central channel of the second Wien filter through which ions in the ion beam can pass.

28. The mass spectrometer of claim 27, wherein the second Wien filter includes a first electrode having a first group of the plurality of electrical conductors, and a second electrode having a second group of the plurality of electrical conductors, the first and second electrodes being spatially separated in a direction perpendicular to the said longitudinal symmetry axis so as at least partially to define between them the said central channel.

29. The mass spectrometer of claim 26, wherein the first electrode comprises an electrically insulating substrate upon or within which is formed the said first group of the plurality of electrical conductors as an array, each conductor extending in a direction parallel with the said longitudinal symmetry axis, and further wherein the second electrode comprises an electrically insulating substrate upon or within which is formed the said second group of the plurality of electrical conductors as an array, each conductor extending in a direction parallel with the said longitudinal symmetry axis.

30. The mass spectrometer of claim 26, wherein each of the electrical conductors in the first group is connected to a first voltage divider, and wherein each of the electrical conductors in the second group is connected to a second voltage divider.

31. The mass spectrometer of claim 1, in which the ion source is an inductively coupled plasma (ICP) ion source.

32. The mass spectrometer of claim 2, in which the reaction cell is a collision cell.

33. A method of mass spectrometry, comprising the steps of:
  (a) generating a beam of ions from a sample;
  (b) selecting ions from the beam in accordance with their mass to charge ratio, using a static field mass filter, selecting the ions from the beam including:
    injecting ions into the static field mass filter, through an entrance aperture thereof,
    deflecting ions away from a longitudinal symmetry axis of the static field mass filter using a first Wien filter, so as to separate ions in a direction orthogonal to the longitudinal symmetry axis, in accordance with their m/z,
    deflecting ions downstream of the first Wien filter back towards the longitudinal symmetry axis, using an inversion lens, and
    focusing ions towards an exit aperture of the static field mass filter using a second Wien filter;
  (c) spatially separating the ions received from the static field mass filter in a sector field analyser, based upon their mass to charge ratio; and
  (d) detecting a plurality of different ion species from the separated ions in a multicollector.

34. The method of mass spectrometry of claim 33, further comprising the step of inducing a mass shift reaction in ions received from the static field mass filter using a reaction cell before spatially separating the ions.

35. The method of claim 33, wherein the step (a) comprises generating ions using an inductively coupled plasma (ICP) ion source.

36. The method of claim 33, further comprising determining at least one isotopic ratio of atoms or molecules contained in the sample on the basis of the plurality of different ion species detected by the multicollector.

* * * * *